United States Patent
O'Connor et al.

(10) Patent No.: US 9,178,894 B2
(45) Date of Patent: Nov. 3, 2015

(54) SECURE ROUTING BASED ON THE PHYSICAL LOCATIONS OF ROUTERS

(71) Applicant: THE BOEING COMPANY, Chicago, IL (US)

(72) Inventors: Michael Lee O'Connor, Redwood City, CA (US); Rachel Rané Schmalzried, San Jose, CA (US); David G. Lawrence, Santa Clara, CA (US); David A. Whelan, Newport Coast, CA (US); Gregory M. Gutt, Ashburn, VA (US)

(73) Assignee: THE BOEING COMPANY, Chicago, IL (US)

( * ) Notice: Subject to any disclaimer, the term of this patent is extended or adjusted under 35 U.S.C. 154(b) by 81 days.

(21) Appl. No.: 13/842,238

(22) Filed: Mar. 15, 2013

(65) Prior Publication Data
US 2013/0232565 A1 Sep. 5, 2013

Related U.S. Application Data

(63) Continuation-in-part of application No. 12/949,404, filed on Nov. 18, 2010, and a continuation-in-part of application No. 13/283,491, filed on Oct. 27, 2011.

(51) Int. Cl.
*H04L 29/06* (2006.01)
*H04B 7/185* (2006.01)
*H04L 9/32* (2006.01)

(52) U.S. Cl.
CPC .......... *H04L 63/107* (2013.01); *H04B 7/18584* (2013.01); *H04B 7/18593* (2013.01); *H04L 63/0227* (2013.01); *H04L 9/3236* (2013.01)

(58) Field of Classification Search
None
See application file for complete search history.

(56) References Cited

U.S. PATENT DOCUMENTS 7,042,392 B2  5/2006  Whelan et al.
7,372,400 B2  5/2008  Cohen et al.

(Continued)

FOREIGN PATENT DOCUMENTS

WO  2004049637 A1  6/2004

OTHER PUBLICATIONS

Tanachaiwiwat, S., Dave, P., Bhindwale, R., Helmy, A., "Location-centric Isolation of Misbehavior and Trust Routing in Energy-constrained Sensor Networks", Copyright 2004 IEEE.*
Younis, O., Fahmy, S., "Constraint-based Routing in the Internet: Basic Principles and Recent Research", IEEE Communications Surveys & Tutorials, Third Quarter 2003, col. 5, No. 1. Copyright IEEE 2003.*
Harsch, C., Festag, A., Papadimitratos, P., "Secure Position-Based Routing for VANETs". Copyright 2007 IEEE.*

(Continued)

*Primary Examiner* — Andrew Nalven
*Assistant Examiner* — Christopher Ruprecht
(74) *Attorney, Agent, or Firm* — Vista IP Law Group LLP; Cynthia A. Dixon

(57) ABSTRACT

A system, method, and apparatus for secure routing based on the physical location of routers are disclosed herein. The disclosed method for secure data transmission of at least one data packet through a plurality of network nodes involves defining a source network node, a destination network node, and at least one security constraint, which is based on the physical location of at least one of the network nodes. The method further involves comparing available network nodes with the security constraint(s) to determine which of the available network nodes meet the security constraint(s) and, thus, are qualified network nodes. Additionally, the method involves determining a route comprising at least one of the qualified network nodes to route the data packet(s) through from the source network node to the destination network node. Further, the method involves transmitting the data packet(s) through the route of the qualified network node(s).

13 Claims, 17 Drawing Sheets

(56) References Cited

U.S. PATENT DOCUMENTS

| | | | |
|---|---|---|---|
| 7,468,696 | B2 | 12/2008 | Bornholdt |
| 7,489,926 | B2 | 2/2009 | Whelan et al. |
| 7,554,481 | B2 | 6/2009 | Cohen et al. |
| 7,579,986 | B2 | 8/2009 | DiEsposti |
| 7,579,987 | B2 | 8/2009 | Cohen et al. |
| 7,583,225 | B2 | 9/2009 | Cohen et al. |
| 7,619,559 | B2 | 11/2009 | DiEsposti |
| 7,688,261 | B2 | 3/2010 | DiEsposti |
| 7,984,294 | B1 | 7/2011 | Goringe et al. |
| 8,046,490 | B1* | 10/2011 | Wu .............................. 709/238 |
| 2003/0217137 | A1* | 11/2003 | Roese et al. ................. 709/223 |
| 2004/0025018 | A1* | 2/2004 | Haas et al. ................... 713/168 |
| 2005/0053050 | A1* | 3/2005 | Ballinger et al. ............ 370/351 |
| 2005/0159891 | A1 | 7/2005 | Cohen et al. |
| 2008/0059059 | A1 | 3/2008 | Cohen et al. |
| 2008/0101367 | A1* | 5/2008 | Weinman ..................... 370/392 |
| 2008/0143605 | A1 | 6/2008 | Bornholdt |
| 2008/0146246 | A1 | 6/2008 | Bornholdt |
| 2008/0209521 | A1* | 8/2008 | Malaney ........................... 726/4 |
| 2009/0174597 | A1 | 7/2009 | DiLellio et al. |
| 2009/0228210 | A1 | 9/2009 | Gutt |
| 2009/0252161 | A1* | 10/2009 | Morris .......................... 370/389 |
| 2009/0315764 | A1 | 12/2009 | Cohen et al. |
| 2009/0315769 | A1 | 12/2009 | Whelan et al. |
| 2010/0171652 | A1 | 7/2010 | Gutt et al. |
| 2010/0182917 | A1* | 7/2010 | Valko et al. ................... 370/252 |
| 2011/0032870 | A1* | 2/2011 | Kumar .......................... 370/328 |
| 2011/0075845 | A1* | 3/2011 | Calcev et al. ................. 380/278 |
| 2013/0019317 | A1* | 1/2013 | Whelan et al. ................. 726/26 |
| 2013/0232565 | A1 | 9/2013 | O'Connor et al. |

OTHER PUBLICATIONS

Leinmuller, T., Maihofer, C., Schoch, E., Kargl, F., "Improved Security in Geographic Ad hoc Routing through Autonomous Position Verification", VANET'06, Sep. 29, 2006, Los Angeles, California, USA. Copyright 2006 ACM.*

Peng, S., Jia, W., Wang, G., Wu, J., Guo, M., "Trusted Routing Based on Dynamic Trust Mechanism in Mobile Ad-Hoc Networks", IEICE Trans. Inf. & Syst., vol. E93-D, No. 3 Mar. 2010. Copyright 2010 IEEE.*

Liu, K., Abu-Ghazaleh, N., Kang, K.-D., "Location verification and trust management for resilient geographic routing", J. Parallel Distrib. Comput. 67 (2007) 215-228. Copyright 2006 Elsevier Inc.*

Stefan Ruhrup, "Theory and Practice of Geographic Routing", Department of Computer Science, University of Freiburg, Germany, Feb. 2009.

Martin Mauve, et al., "A Survey on Position-Based Routing in Mobile Ad Hoc Networks", IEEE Network, Nov./Dec. 2001.

Young-Bae Ko, et al., "Location-Aided Routing (LAR) in Mobile Ad Hoc Networks", Wireless Networks 6 (2000) 307-321.

International Search Report, PCT/US2014/011927, Apr. 1, 2014.

Tanachaiwiwat S., et al., "Secure Locations: Routing on Trust and Isolating Compromised Sensors in Location-Aware Sensor Networks", Sensys '03, Proceedings on the 1st International Conference on Embedded Networked Sensor Systems, Los Angeles, CA, Nov. 5-7, 2003; [Proceedings of the International Conference on Embedded Networked Sensor Systems], New York, NY: ACM, US, vol. Conf. 1, Nov. 1, 2003, p. 324/325, XP0015054122, DOI: 10.1145/958491.958542, ISBN: 978-1-58113-707-1, p. 324, paragraph Section 1.

* cited by examiner

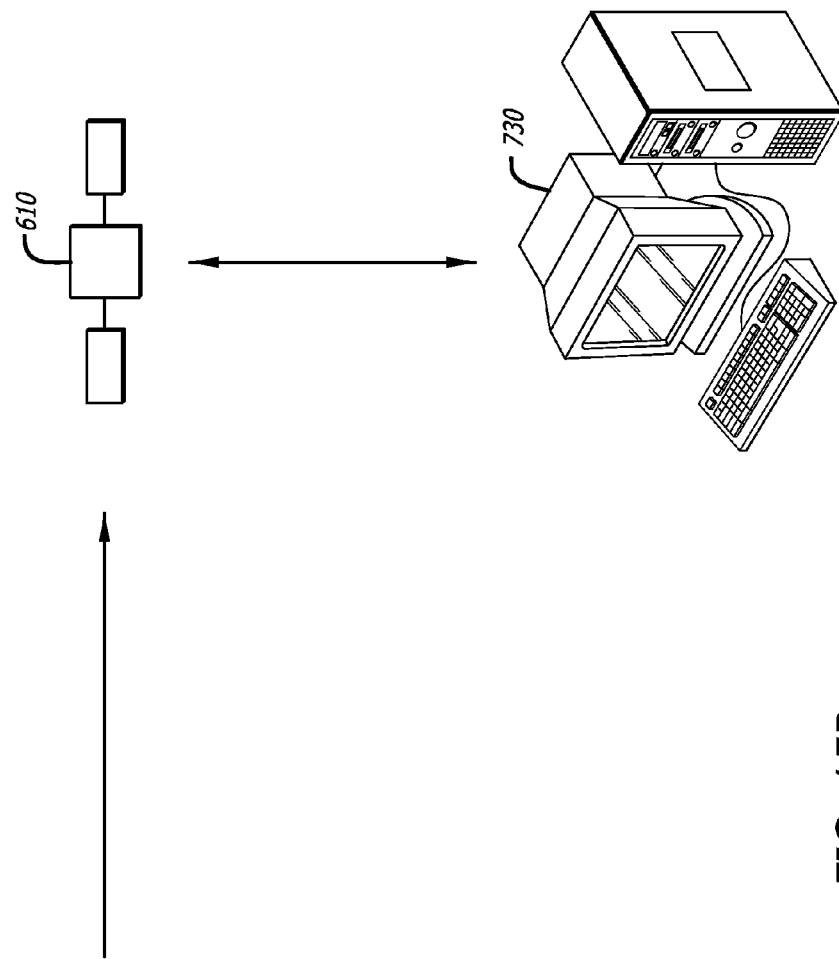
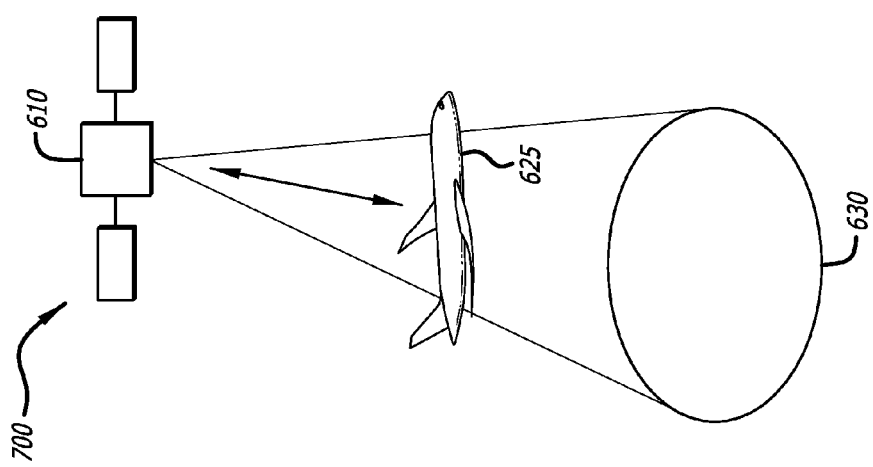
FIG. 15B

SECURE ROUTING BASED ON THE PHYSICAL LOCATIONS OF ROUTERS

CROSS-REFERENCE TO RELATED APPLICATIONS

This application is a Continuation-In-Part application of, and claims priority to and the benefit of U.S. patent application Ser. No. 12/949,404, filed Nov. 18, 2010, entitled "Spot Beam Based Authentication". This application is a Continuation-In-Part application of, and claims priority to and the benefit of U.S. patent application Ser. No. 13/283,491, filed Oct. 27, 2011, entitled "Geothentication Based on Network Ranging". The contents of both of these applications are hereby incorporated by reference in their entirety.

FIELD

The present disclosure relates to secure routing. In particular, it relates to secure routing based on the physical locations of routers.

BACKGROUND

Position-based routing is a general term describing the method of using the position of routers (e.g., network nodes) for making data packet routing and/or forwarding decisions. Previous implementations of position-based routing have aimed to optimize the network route for efficiency, not for security. Cyber attacks are becoming more advanced and having more catastrophic impacts on the networks in question and their associated users. One such attack, the man-in-the-middle (MITM) attack, has been used to reroute data for ill-intentioned purposes. The present disclosure provides an enhanced data routing security system and associated methods to mitigate data being routed outside of defined constraints.

SUMMARY

The present disclosure relates to a method, system, and apparatus for secure routing based on the physical locations of routers (e.g., network nodes). In particular, the present disclosure teaches the use of position-based routing techniques to ensure that information is securely transferred from a source to a destination. A method is defined to send a data packet through a network path that requires that security constraints are met. The security constraints are based on the physical location of one or more network routers.

In one or more embodiments, a method for secure data transmission of at least one data packet through a plurality of network nodes is disclosed. The disclosed method involves defining, by at least one user, a source network node and a destination network node. In at least one embodiment, the source network node and the destination network node are in the plurality of network nodes. The method further involves defining, by at least one user, at least one security constraint, where the security constraint(s) is based on the physical location of at least one of the network nodes. Also, the method involves comparing, by at least one processor, available network nodes in a map of the network nodes with at least one security constraint to determine which of the available network nodes are qualified network nodes. Qualified network nodes are the available network nodes that meet the security constraint(s). In addition, the method involves determining, by at least one processor, a route comprising at least one of the qualified network nodes to route at least one data packet through from the source network node to the destination network node. Further, the method involves transmitting at least one data packet from the source network node to the destination network node through the route comprising at least one qualified network node.

In at least one embodiment, at least one network node is a router, a server, a personal computing device, a personal digital assistant (PDA), a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node. In one or more embodiments, at least one network node is stationary and/or mobile. In some embodiments, at least one network node is housed in a vehicle.

In at least one embodiment, at least one user is a person, an entity, an application, a program, a node, a router, a mobile device, a processor, and/or a computer. In some embodiments, at least one security constraint is that the data packet(s) must be routed through the network nodes that are physically located within at least one specified geographic region. In at least one embodiment, at least one security constraint is that the data packet(s) must be routed through the network nodes that are not physically located within the at least one specified geographic region. In some embodiments, at least one geographic region is a nation, a state, a province, a county, a government facility (e.g., a military base), and/or a city. In one or more embodiments, at least one geographic region is defined by a polygon, which is defined by points. In some embodiments, the polygon is a regular shape or an irregular shape. In at least one embodiment, the points are defined by at least one user specifying the longitude and latitude of each of the points.

In one or more embodiments, the map of the network nodes comprises information regarding the physical location of at least one of the network nodes, information regarding whether the physical location of any of the network nodes can be authenticated by using satellite geolocation techniques, information regarding whether the physical location of any of the network nodes can be authenticated by using network ping ranging measurements, information regarding whether any of the network nodes can encrypt data packets, and/or information regarding whether any of the network nodes can decrypt data packets. In at least one embodiment, the network nodes map is maintained by at least one server.

In one or more embodiments, at least one security constraint is that the data packet(s) must be routed through the network nodes that can have their physical locations authenticated by using satellite geolocation techniques. In some embodiments, the satellite geolocation techniques use at least one authentication signal in order to obtain the physical location of the network node(s). In one or more embodiments, at least one authentication signal is transmitted by at least one transmission source, and is received by at least one receiving source associated with the network node(s). In some embodiments, at least one transmission source is employed in at least one satellite and/or at least one pseudo-satellite. In at least one embodiment, at least one satellite is a Lower Earth Orbiting (LEO) satellite, a Medium Earth Orbiting (MEO) satellite, and/or a Geosynchronous Earth Orbiting (GEO) satellite. In some embodiments, the LEO satellite is an Iridium LEO satellite.

In at least one embodiment, the disclosed method employs an Iridium LEO satellite constellation. In one or more embodiments, each of the Iridium LEO satellites in the constellation has an antenna geometry that transmits forty-eight (48) spot beams with a distinctive spot beam pattern. In at least one embodiment, at least one authentication signal may be transmitted from at least one of the Iridium satellites in the constellation. The forty-eight (48) spot beams of an Iridium satellite may be used to transmit localized authentication signals to receiving sources located on or near the Earth's surface. The broadcasted message burst content associated with these signals includes pseudorandom noise (PRN) data. Since a given message burst may occur within a specific satellite spot beam at a specific time, the message burst content including PRN and unique beam parameters (e.g., time, satellite identification (ID), beam identification (ID), time bias, orbit data, etc.) may be used to authenticate the physical location of the network node(s). It should be noted that when employing one of the above-described Iridium LEO satellites, the transmission signal power is sufficiently strong enough to allow for the authentication signal to penetrate into an indoor environment reliably, and may employ signal encoding methods in order to do so. This allows for these geolocation techniques to be used for many indoor applications. It should be further noted that this system could employ at least one next generation Iridium satellite, or a combination of existing Iridium satellites with the next generation Iridium satellite configuration.

In one or more embodiments, at least one security constraint is that the data packet(s) must be routed through the network nodes that can have their physical locations authenticated by using network ping ranging measurements. In some embodiments, the network ping ranging measurements are obtained from the amount of time lapsed during pings (or ping-like messages) being sent back and forth from one network node to another network node.

In at least one embodiment, at least one security constraint is that if the network nodes are unable to have their physical locations authenticated (e.g., either by satellite geolocation techniques or by network ping ranging techniques), the data packet(s) can be routed through the network nodes only if the at least one data packet is encrypted. For these embodiments, the method further involves encrypting, with at least one processor of at least one network node, data in the data packet(s). Also, the method involves transmitting, with at least one of the network nodes, the encrypted data packet(s). In addition, the method involves receiving, with at least one of the network nodes, the encrypted data packet(s). Additionally, the method involves decrypting, with at least one processor of at least one network node, the encrypted data in the data packet(s). This technique of transmitting, by at least one network node, encrypted data packet(s), and receiving, by another at least one network node, the encrypted data packet(s) is referred to as "encrypted tunneling". This technique allows for network nodes to securely transmit and receive data packets across a path of network nodes that cannot have their physical locations verified.

In one or more embodiments, at least one of the at least one security constraint is that the at least one data packet must travel from the source network node to the destination network node on a route that has a length less than a threshold distance.

In at least one embodiment, at least one processor is employed in a router, a server, a personal computing device, a personal digital assistant (PDA), a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and/or a fourth generation (4G) wireless node.

In one or more embodiments, a method for secure data transmission of at least one data packet through a plurality of network nodes involves defining, by at least one user, a source network node and a destination network node, where the source network node and the destination network node are in the plurality of network nodes. The method further involves defining, by at least one user, at least one security constraint, where at least one security constraint is based on the physical location of at least one of the network nodes. Also, the method involves encoding, by at least one processor, at least one security constraint into the data packet(s). In addition, the method involves determining, by the source network node, which available network nodes connected to the source network node are qualified network nodes. Qualified network nodes are the available network nodes that meet at least one security constraint. Additionally, the method involves transmitting, by the source network node, the data packet(s) to one of the qualified network nodes. Also, the method involves determining, by any network node that receives the data packet(s), which available network nodes connected to the network node that receives the data packet(s) are qualified network nodes. Further, the method involves transmitting, by any network node that receives the data packet(s), the data packet(s) to one of the qualified network nodes, where the data packet(s) is transmitted in a route from the source network node to the destination network node through the qualified network nodes.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIGS. 9 through 13 are directed towards the disclosed system and method for geothentication based on network ranging for network nodes.

FIG. 9 is a schematic diagram of the disclosed system for authenticating the physical location of a network node, in accordance with at least one embodiment of the present disclosure.

FIG. 11 is a schematic diagram of two network routers each employing a response message hardware device for sending messages, in accordance with at least one embodiment of the present disclosure.

FIG. 12 is a schematic diagram of a response message hardware device attached to a router showing the device being placed in-line with the incoming data line, in accordance with at least one embodiment of the present disclosure.

Figure 13:
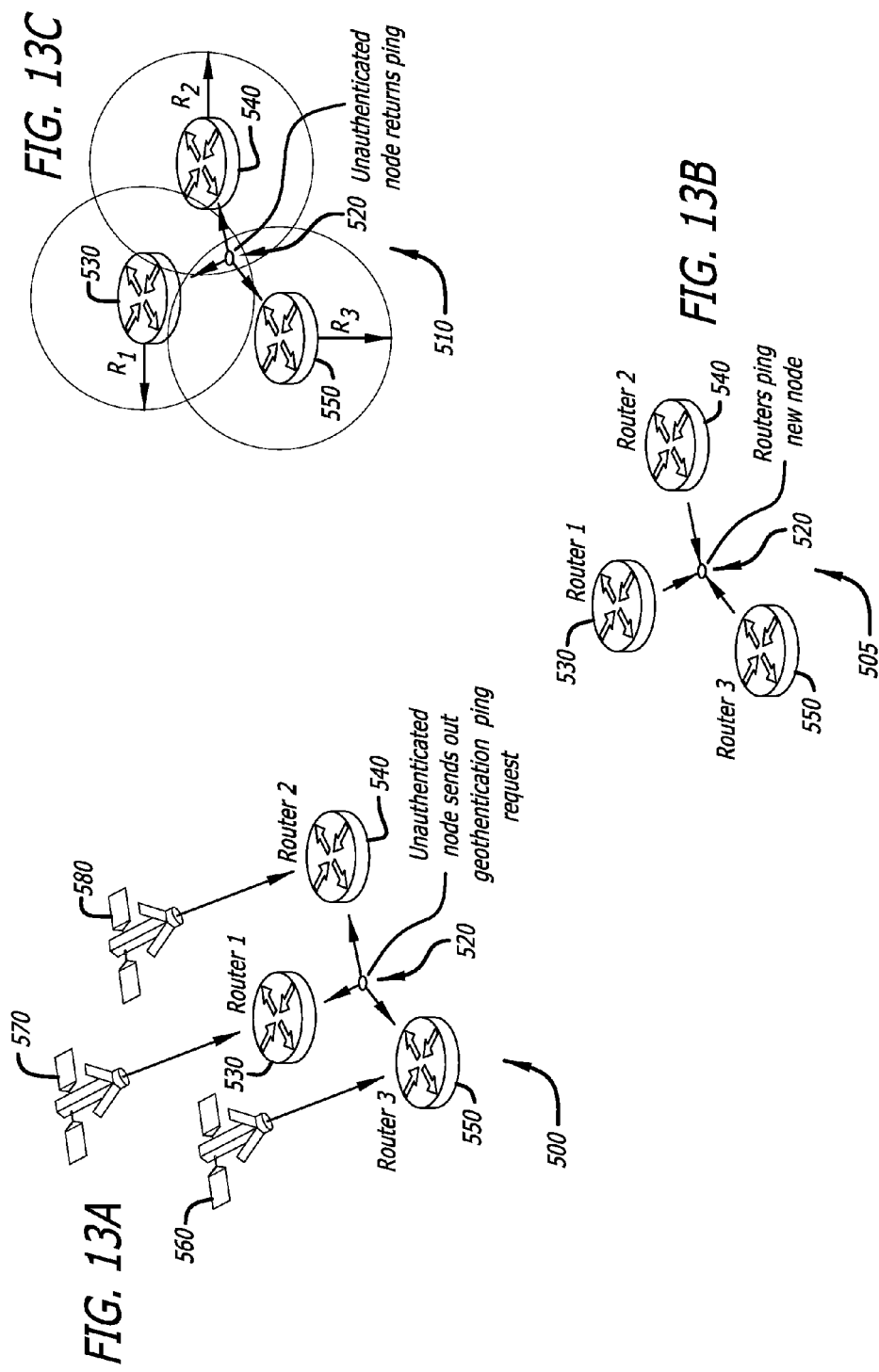

FIGS. 13A, 13B, and 13C are schematic diagrams, when viewed together, depicting a new network node entering the network and having its physical location authenticated by the disclosed system, in accordance with at least one embodiment of the present disclosure.

FIGS. 14 through 17 are directed towards the disclosed system and method for spot beam based authentication of network nodes.

Figure 14:
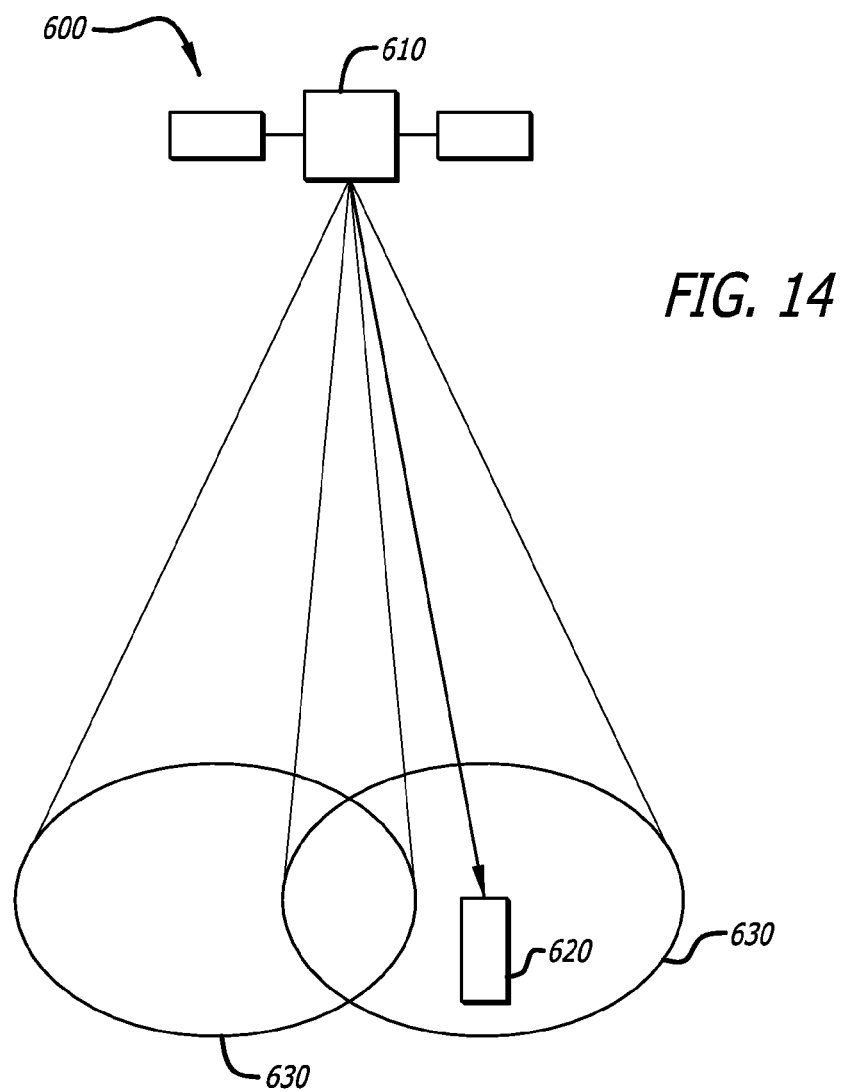

FIG. 14 is a schematic diagram of a satellite-based communication system that may be employed by the disclosed spot beam based authentication system, in accordance with at least one embodiment of the present disclosure.

Figure 15A:
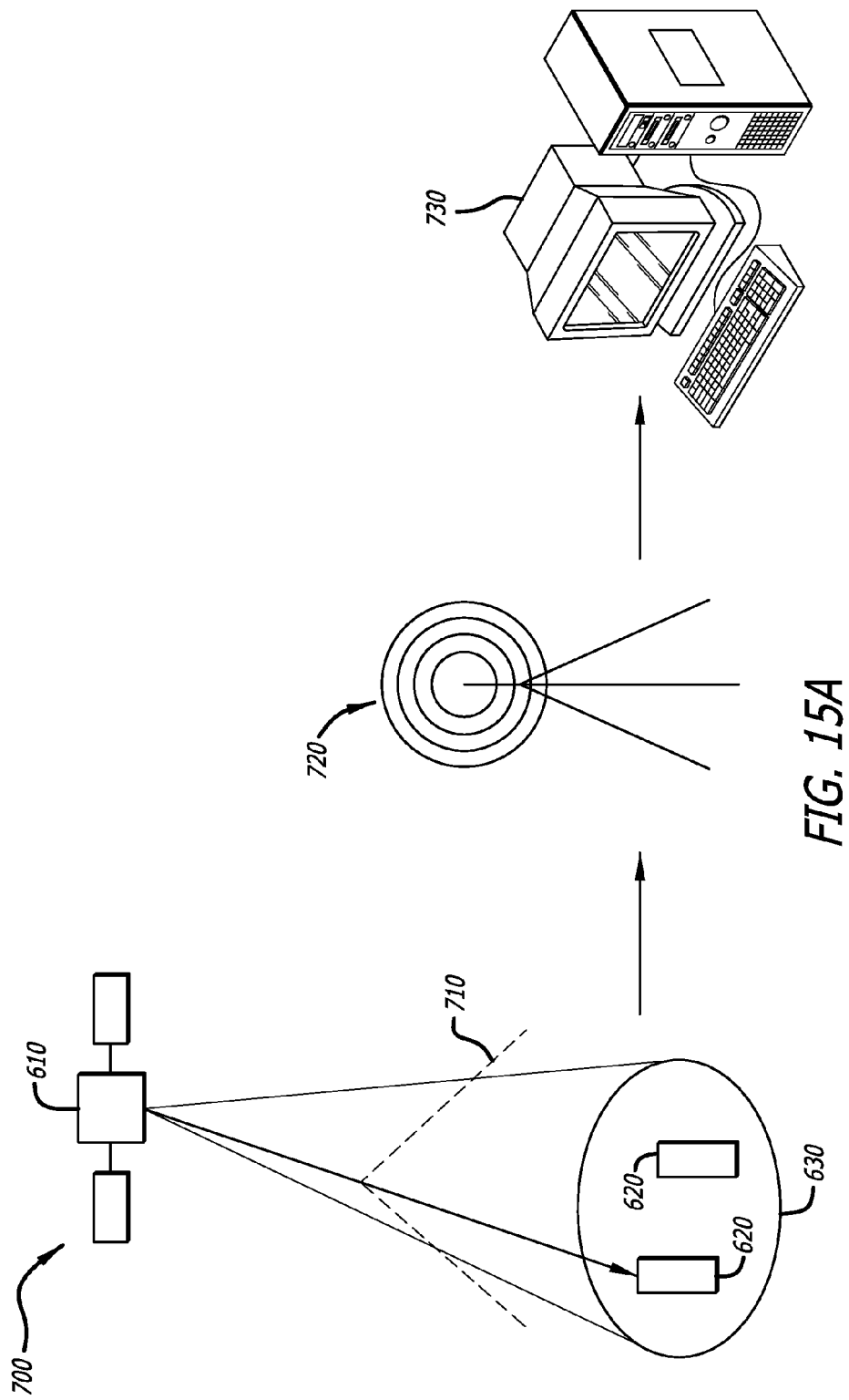
Figure 15C:
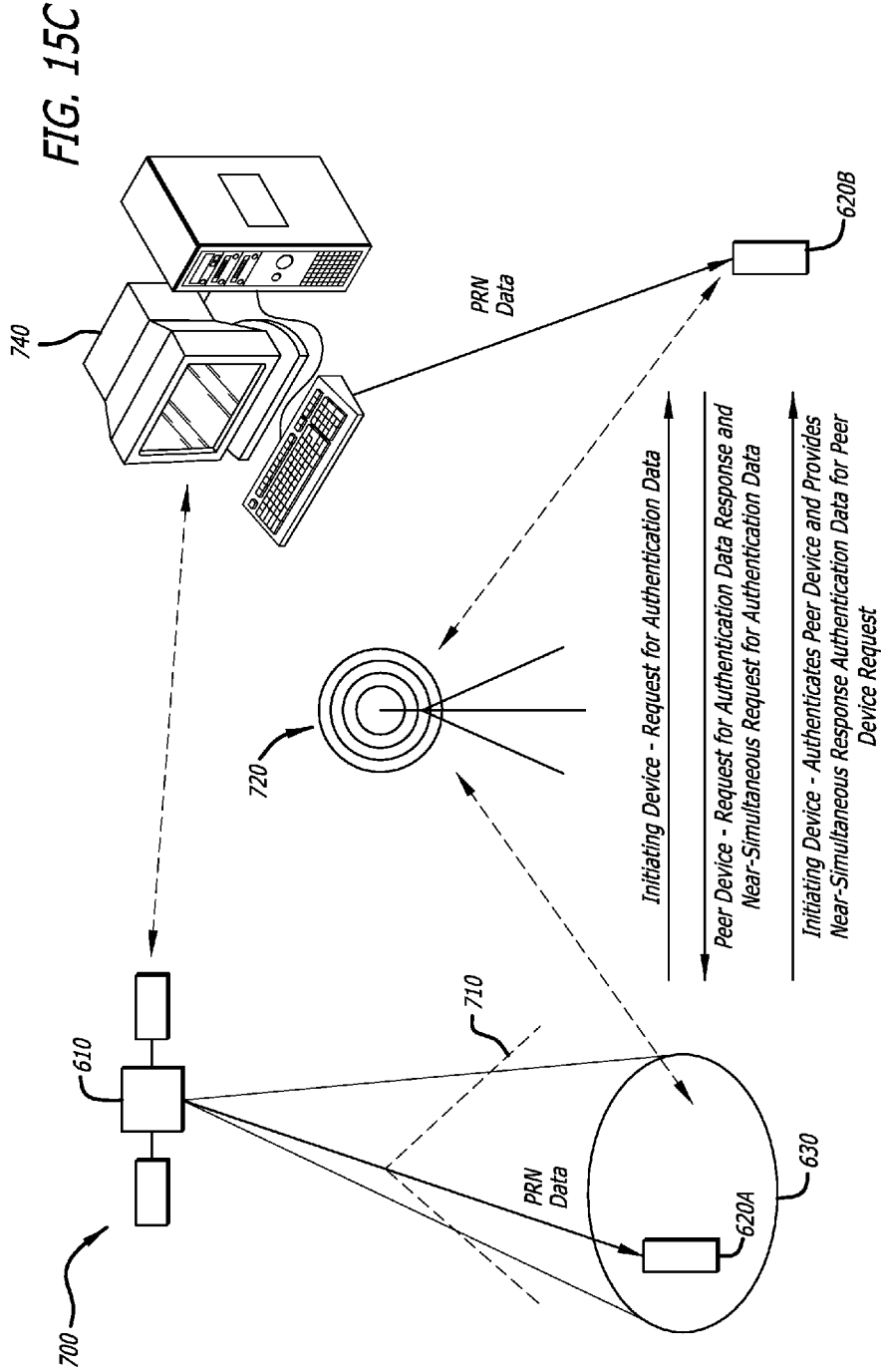

FIGS. 15A, 15B, and 15C are schematic diagrams illustrating satellite-based authentications systems, in accordance with at least one embodiment of the present disclosure.

Figure 16A:
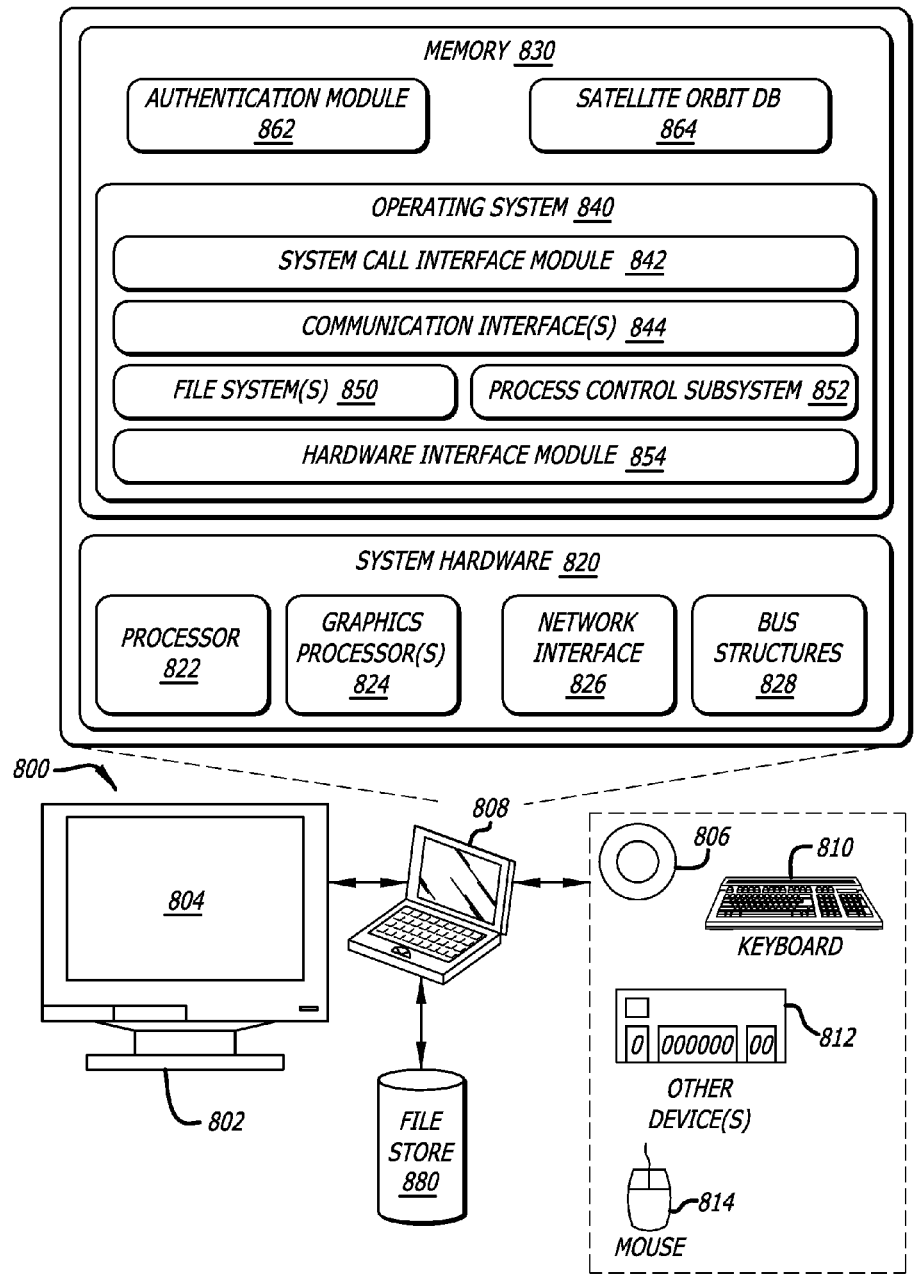

FIG. 16A is a schematic diagram of a computing device which may be adapted to implement the disclosed satellite-based authentication system, in accordance with at least one embodiment of the present disclosure.

Figure 16B:
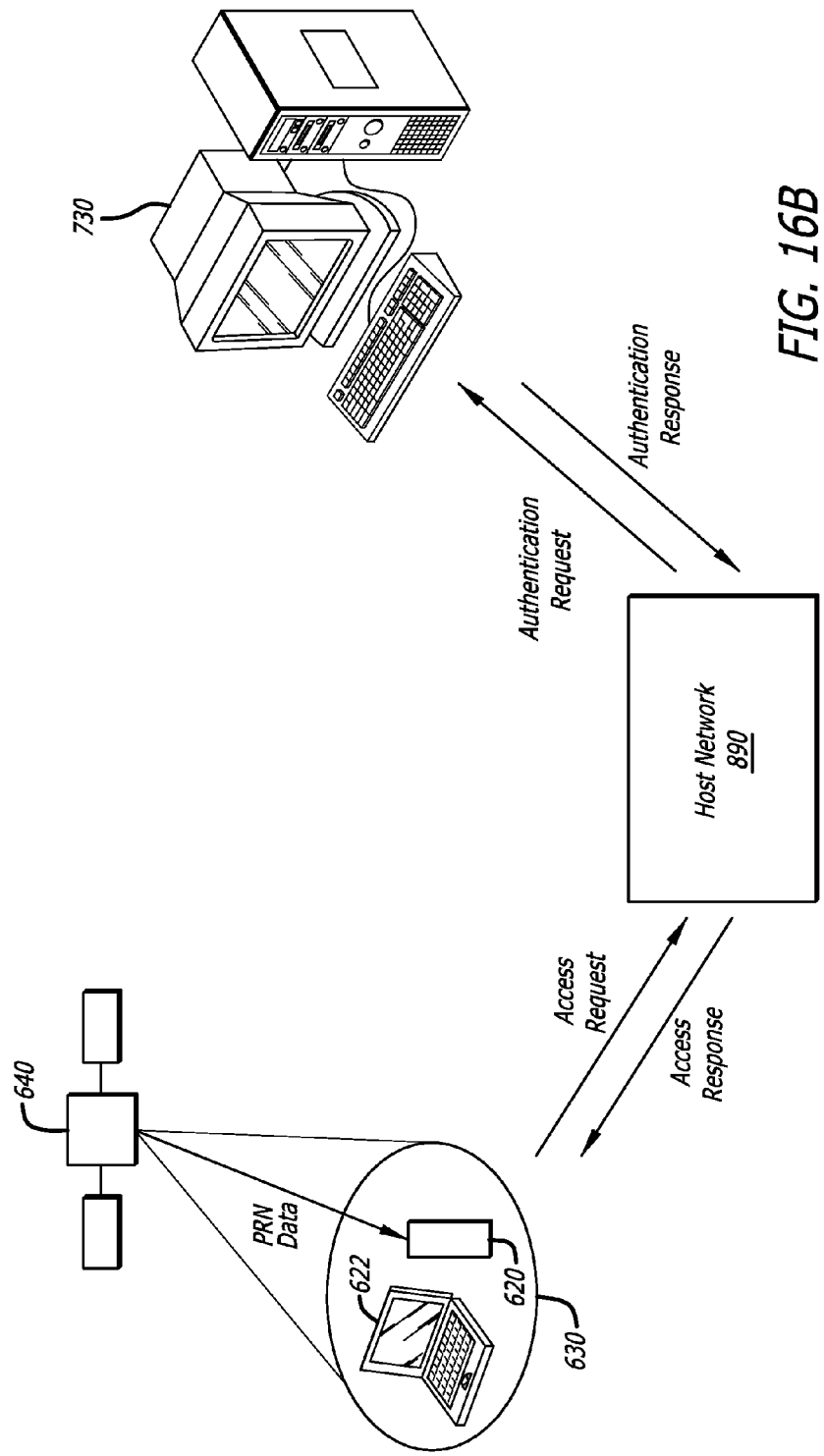

FIG. 16B is a schematic diagram of a satellite-based communication system that may be employed by the disclosed spot beam based authentication system, in accordance with at least one embodiment of the present disclosure.

Figure 17:
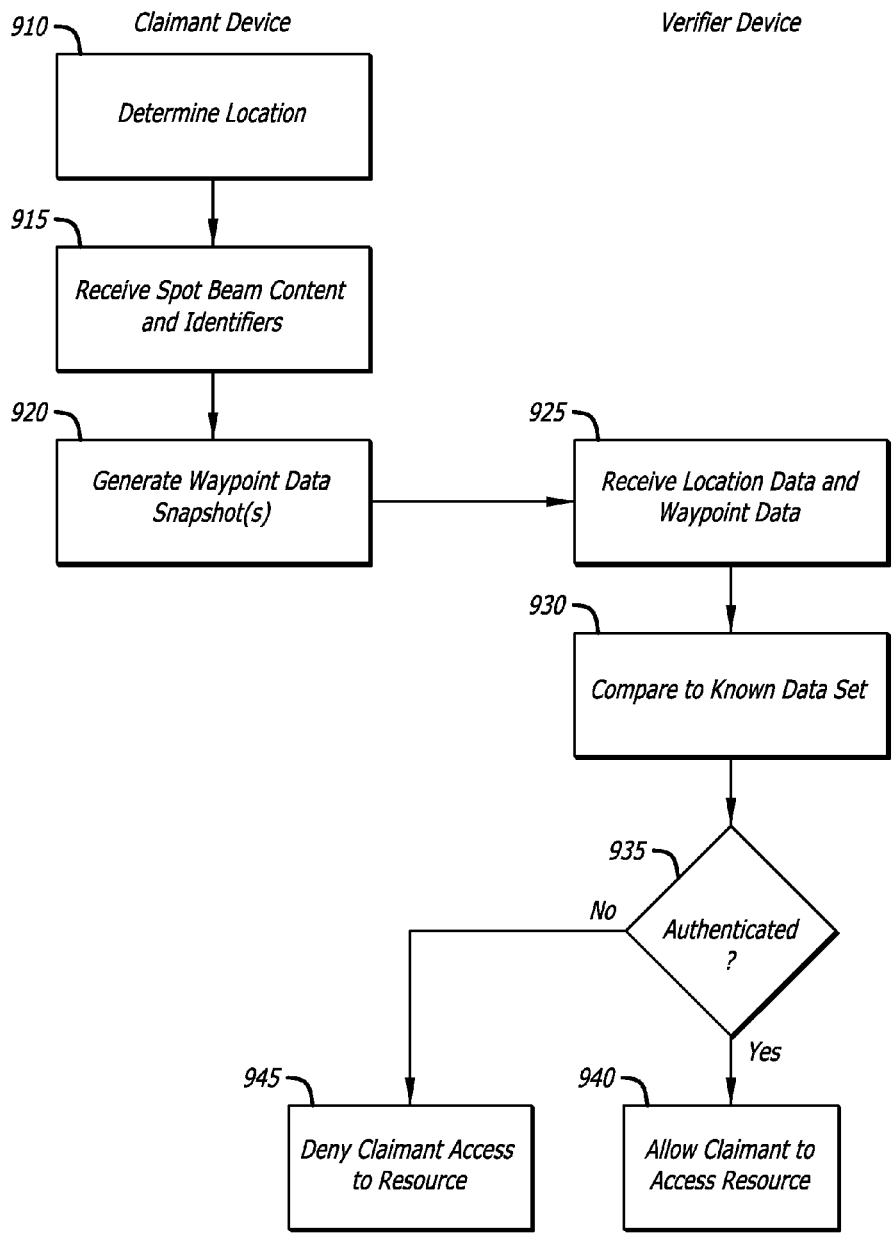

FIG. 17 is a flow diagram showing the disclosed spot beam based authentication method to authenticate a target node, in accordance with at least one embodiment of the present disclosure.

DESCRIPTION

The methods and apparatus disclosed herein provide an operative system for secure routing based on the physical locations of routers. In particular, the system relates to the use of position-based routing techniques to ensure that information is securely transferred from a source to a destination. Specifically, the system is used to send a data packet through a network path that meets defined security constraints, where the security constraints are based on the physical location of one or more network routers.

Position-based routing is a general term describing the method of using the position of routers (e.g., network nodes) for making data packet routing and/or forwarding decisions. Previous implementations of position-based routing have aimed to optimize the network route for efficiency, not for security.

The concept of position-based routing has been studied from a theoretical perspective, but has rarely been implemented in practice. Instead, more standard techniques are generally employed for network routing, such as Routing Information Protocol (RIP) and the Open-Shortest-Path-First protocol (OSPF). These practices are focused more on data packet routing for efficiency than on data packet routing for network security. Where position-based routing has been implemented, it has typically been used to improve the efficiency of ad-hoc networks of vehicles or mobile devices.

The present disclosure focuses on the use of position-based routing techniques to ensure that information is securely transferred through a network of routers (or nodes) from a source to a destination.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
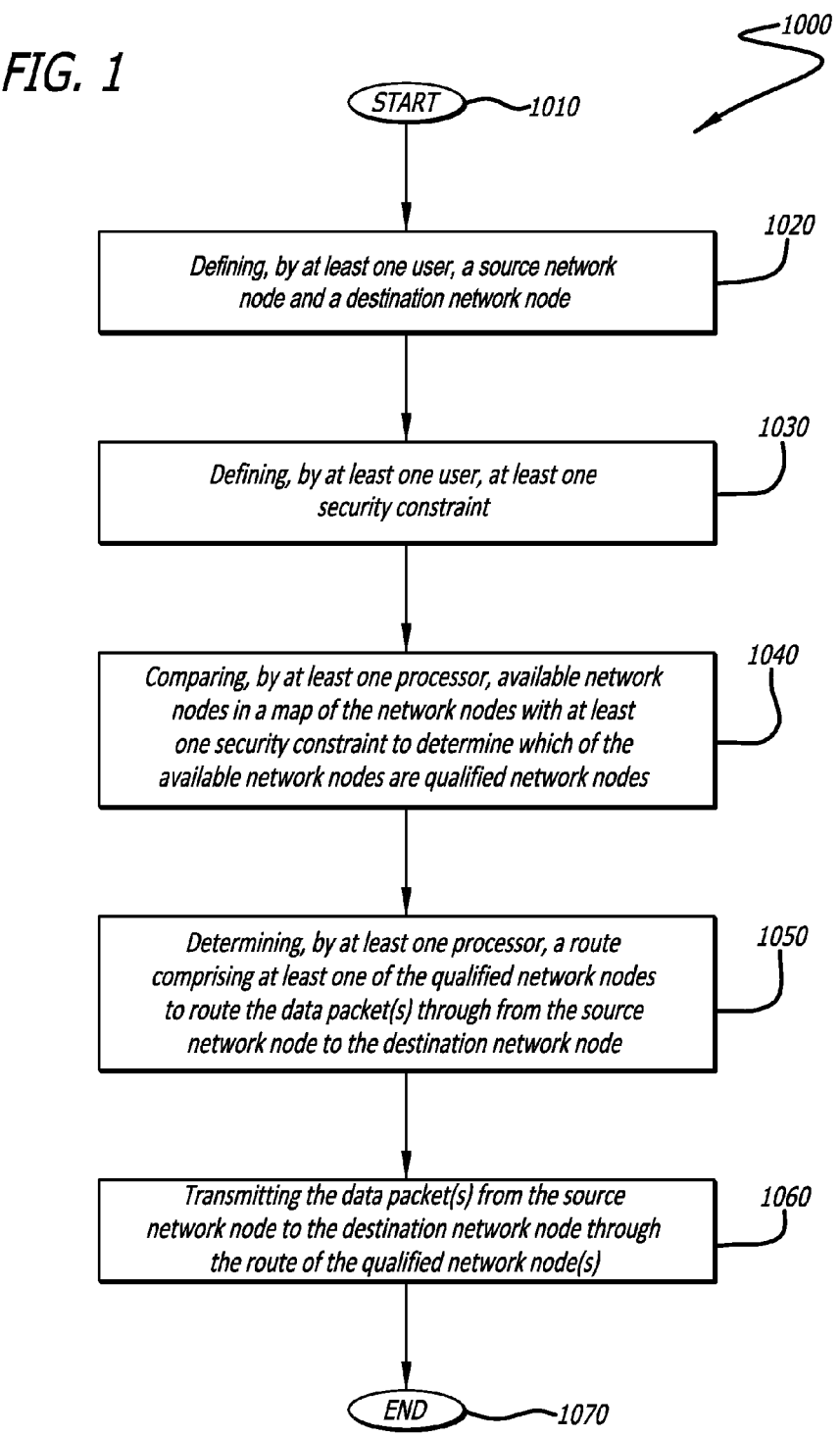
FIG. 1 shows a flow chart of the disclosed method for secure routing based on the physical locations of routers where the method is a static routing method, in accordance with at least one embodiment of the present disclosure.

FIG. 1 shows a flow chart of the disclosed method 1000 for secure routing based on the physical locations of routers where the method is a static routing method, in accordance with at least one embodiment of the present disclosure. In particular, this method 1000 provides secure data transmission of at least one data packet through a plurality of network nodes. At the start 1010 of the method 1000, at least one user defines a source network node and a destination network node 1020, where the source network node and the destination network node are in the plurality of network nodes. The source network node is the network node where the data packet(s) originates, and the destination network node is the network node that the data packet(s) is to be transmitted to. It should be noted that at least one user is a person, an entity, an application, a program, a node, a router, a mobile device, a processor, and/or a computer.

Then, at least one user defines at least one security constraint 1030, where the security constraint(s) is based on the physical location of at least one of the network nodes. It should be noted that, in one or more embodiments, various different types of security constraints may be employed. Types of security constraints that may be employed include, but are not limited to, (1) that the data packet(s) must be routed through network nodes that are physically located within at least one specified geographic region, (2) that the data packet(s) must be routed through network nodes that are not physically located within at least one specified geographic region, (3) that the data packet(s) must be routed through network nodes that can have their physical locations authenticated by using satellite geolocation techniques (refer to the description of FIGS. 14-17 for a discussion of example satellite geolocation techniques), (4) that the data packet(s) must be routed through network nodes that can have their physical locations authenticated by using network ping ranging measurements (refer to the description of FIGS. 9-13 for a discussion of example network ping ranging measurement techniques), (5) that the data packet(s) can be routed through network nodes that are unable to have their physical locations authenticated in a way that is deemed acceptable (e.g., the network node is not capable of using acceptable methods of physical location authentication, such as by using satellite geolocation techniques and/or by using network ping ranging measurements) only if the data in the data packet(s) is encrypted while the data packet(s) passes through these network nodes, and (6) that the data packet(s) must travel from the source network node to the destination network node on a route that has a length less than a threshold distance (e.g., 100 miles).

At least one processor then compares available network nodes in a map of the network nodes with the security constraint(s) to determine which of the available network nodes are qualified network nodes 1040. Qualified network nodes are the available network nodes that meet the security constraint(s). It should be noted that, in one or more embodiments, the map of network nodes may include, but are not limited to: (1) information regarding the physical location of at least one of the network nodes (e.g., whether a network node(s) is located in a secure location, such as on a military base), (2) information regarding whether the physical location of any of the network nodes can be authenticated by using satellite geolocation techniques, (3) information regarding whether the physical location of any of the network nodes can be authenticated by using network ping ranging measurements, (4) information regarding whether the physical location of any of the network nodes can be authenticated by using triangulation methods (e.g., by performing triangulation between cellular towers, such as how public service answering points (PSAPs) often use cell phone tower triangulation methods to determine the approximate physical location of a cell phone during a 911 emergency call), (5) information regarding whether any of the network nodes can encrypt data packets, (6) information regarding whether any of the network nodes can decrypt data packets, and (7) information regarding whether any of the network nodes have been determined to be qualified network nodes, which are network nodes that meet the security constraint(s).

Then, at least one processor, determines a route comprising at least one of the qualified network nodes to route the data packet(s) through from the source network node to the destination network node 1050. Then, the data packet(s) is transmitted from the source network node to the destination network node through the route of the qualified network node(s) 1060. Then, the method 1000 ends 1070.

Figure 2:
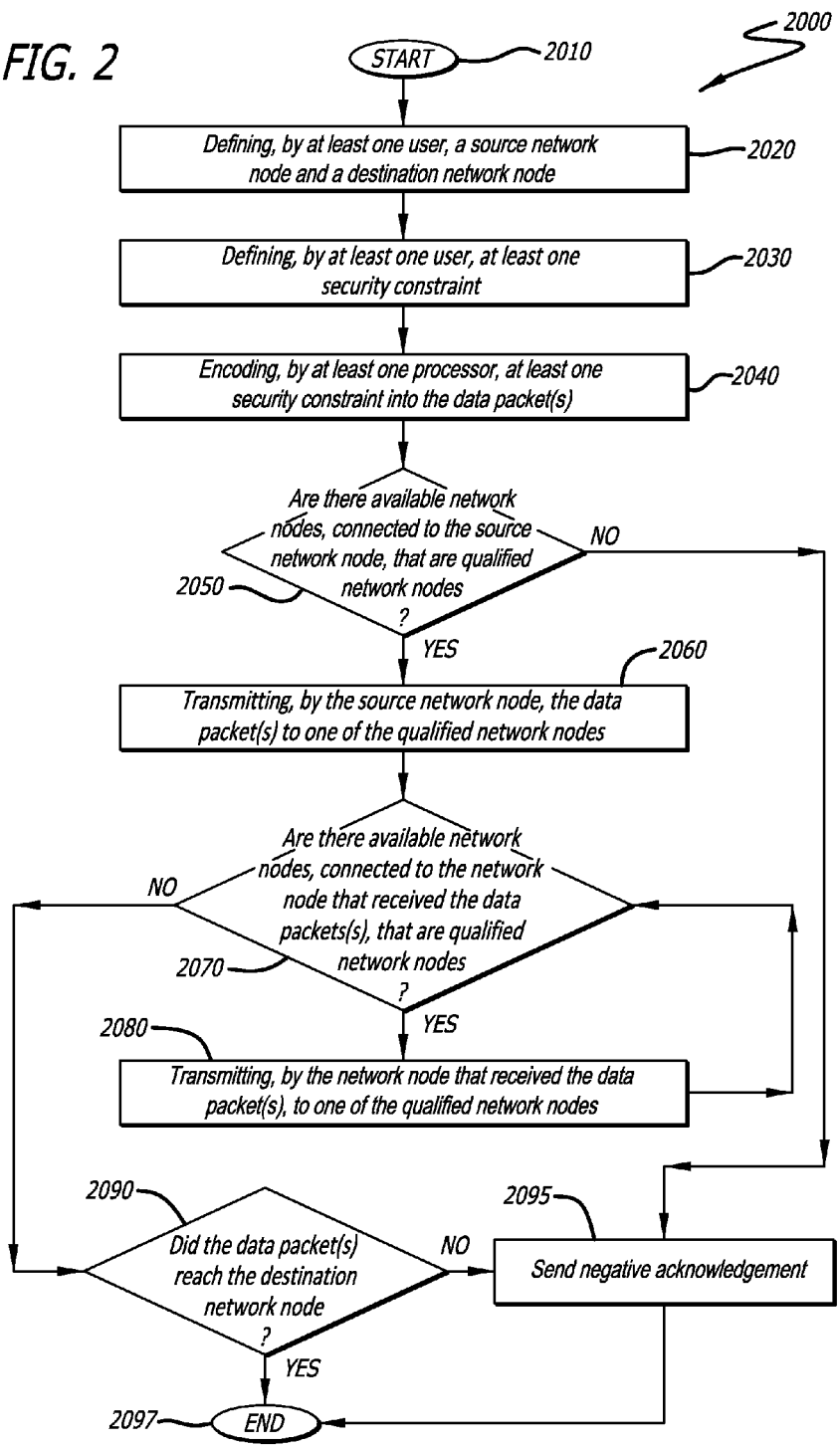
FIG. 2 illustrates a flow chart of the disclosed method for secure routing based on the physical locations of routers where the method is an adaptive (or dynamic) routing method, in accordance with at least one embodiment of the present disclosure.

FIG. 2 illustrates a flow chart of the disclosed method 2000 for secure routing based on the physical locations of routers where the method is an adaptive (or dynamic) routing method, in accordance with at least one embodiment of the present disclosure. Similar to the method 1000 of FIG. 1, this method 2000 provides secure data transmission of at least one data packet through a plurality of network nodes. At the start 2010 of the method 2000, at least one user defines a source network node and a destination network node 2020. At least one user then defines at least one security constraint 2030. Then, at least one processor encodes the security constraint(s) into (or by appending) the data packet(s) 2040.

Then, at least one processor in the source network node determines whether there are available network nodes connected to the source network node that are qualified network nodes, which are the available network nodes that meet the security constraint(s) 2050. If the processor(s) determines that there are not any available network nodes connected to the source network node that are qualified network nodes, then a negative acknowledgement message (e.g., a NAK) is sent to the user(s) 2095 letting the user(s) know that the data packet(s) will not be able to reach the destination network node. Then, the method 2000 ends 2097.

However, if the processor(s) determines that there are available network nodes connected to the source network node that are qualified network nodes, then the source network node transmits the data packet(s) to one of the qualified network nodes 2060. After the source network node transmits the data packet(s) to one of the qualified network nodes, at least one processor in the network node that received the data packet(s) determines whether there are available network nodes connected to the network node that received the data packet(s) that are qualified network nodes 2070. If the processor(s) determines that there are available network nodes connected to the network node that received the data packet(s) that are qualified network nodes, then the network node that received the data packet(s) transmits the data packet(s) to one of the qualified network nodes 2080. Then, the process proceeds back to step 2070.

However, if the processor(s) determines that there are not any available network nodes connected to the network node that received the data packet(s) that are qualified network nodes, then at least one processor determines whether the data packet(s) reached the destination network node 2090. If the processor(s) determines that the data packet(s) did not reach the destination network node, a negative acknowledgement message (e.g., a NAK) is sent to the user(s) 2095, and the method 2000 ends 2097. If the processor(s) determines that the data packet(s) did reach the destination network node, the method 2000 simply ends 2097. It should be noted that after the method 2000 ends 2097, the user may attempt to resend the data packet(s) and, optionally, to also select different security constraints to be used for the retransmission of the data packet(s).

Figure 3:
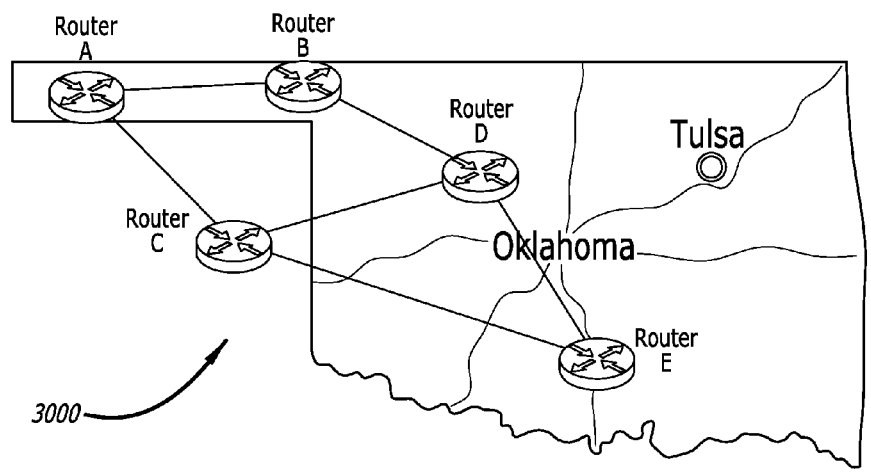
FIG. 3 is a schematic diagram of an exemplary network of five nodes on a map to illustrate the operation of the disclosed system and method for secure routing based on the physical locations of routers, in accordance with at least one embodiment of the present disclosure.

FIG. 3 is a schematic diagram 3000 of an exemplary network of five nodes (e.g., routers) on a map to illustrate the operation of the disclosed system and method for secure routing based on the physical locations of routers, in accordance with at least one embodiment of the present disclosure. In this figure, five nodes (or routers) (Router A, Router B, Router C, Router D, and Router E) are shown on a map of the state of Oklahoma. A user associated with Router A (i.e. the source network node) desires to send information (e.g., data packets) to a user associated with Router E (i.e. the destination network node). For this example, the information has a security constraint that the information (i.e. the data packets) must remain in the state of Oklahoma.

It should be noted that, alternatively, in other embodiments, the information may have a security constraint such that the information (e.g., the data packets) must remain outside of the state of Oklahoma, thereby excluding the network nodes that are physically located within this particular geographic region from being used for the routing of the data packets.

Figure 4:
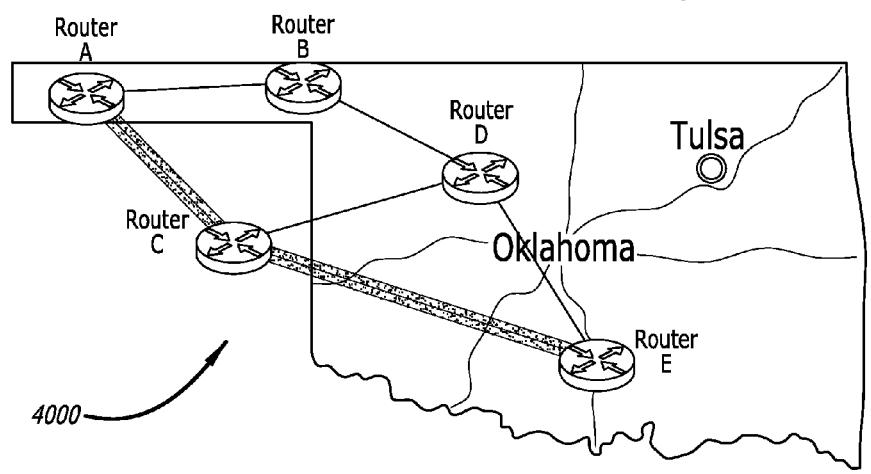
FIG. 4 is a schematic diagram depicting the route the data packets would travel in the exemplary network of FIG. 3 using standard position-based routing techniques, in accordance with at least one embodiment of the present disclosure.

FIG. 4 is a schematic diagram 4000 depicting the route the data packets would travel in the exemplary network of FIG. 3 using standard position-based routing techniques (such as Routing Information Protocol (RIP) or the Open-Shortest-Path-First (OSPF) protocol), in accordance with at least one embodiment of the present disclosure. Standard position-based routing techniques (e.g., RIP or OSPF protocol) do not account for security constraints based on the physical location of the routers. Routing technique RIP, for example, uses the hop count as a routing metric. Since the router path Router A-Router C-Router E has the fewest hops to get from Router A to Router E, this would typically be the RIP selected path.

It should be noted that existing standard position-based routing techniques are optimized to minimize the distance the data packets travel. Since the Router path Router A-Router C-Router E is the shortest path distance between Router A and Router E, this path would be the selected path to send the data packets. As can be seen in this figure, since the data packets are routed through Router C, the data packets travel outside of the state of Oklahoma and, thus, the use of these standard position-based routing techniques would cause a violation of the security constraint that the data packets must remain in the state of Oklahoma.

Figure 5:
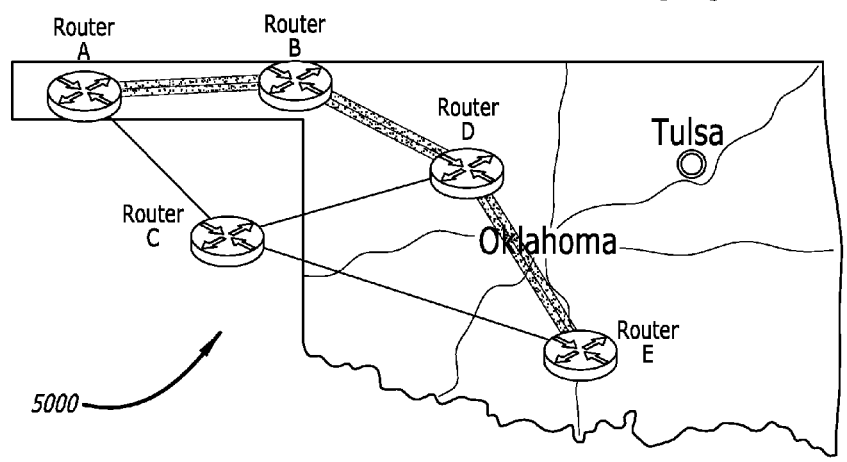
FIG. 5 is a schematic diagram illustrating the route the data packets would travel in the exemplary network of FIG. 3 using the disclosed method for secure routing based on the physical locations of routers having a geographic constraint, in accordance with at least one embodiment of the present disclosure.

FIG. 5 is a schematic diagram 5000 illustrating the route the data packets would travel in the exemplary network of FIG. 3 using the disclosed method for secure routing based on the physical locations of routers having a geographic constraint, in accordance with at least one embodiment of the present disclosure. For this example, the geographic constraint is that the data packets must remain within the state of Oklahoma. For this figure, the optimal path (or route) is found that meets this particular geographic constraint, and the disclosed source routing techniques are used to ensure that the data packets travel along this optimal path. In this figure, the optimal path is shown to be from Router A-Router B-Router D-Router E.

In this embodiment, a user, a user application, and/or a processor is aware the geographic constraints and has access to (e.g., knowledge of) the physical locations and interconnections of the routers. The user, user application, and/or processor uses this information to determine the best path to route the data packets through the network that meets the geographic constraint. Source routing instructions are added to (e.g., encoded to) the data packets that describe the best path, and the routers along the path follow these routing instructions. In this example, the best path (Router A-Router B-Router D-Router E) ensures that the data packets remain within the state of Oklahoma.

In a similar embodiment, instead of the user, user application, or processor; Router A is aware of the geographic constraint (e.g., because the geographic constraint is embedded (or encoded) within the data packets, or because Router A is a corporate router or a government agency router that has been configured to know which geographic regions are acceptable, and/or unacceptable, for the data packets to travel through). In this embodiment, Router A also has access to the physical locations and interconnections of the routers, and uses this information to compute the best path through the network that meets the constraints.

In another embodiment, the user, the user application, processor, or Router A provides the source network node information and the destination network node information to a server. The server (e.g., a Geothentication server, which is a server that is used to authenticate the physical location of a node(s), in at least one embodiment, by using satellite geolocation techniques) has access to a network node (e.g., router) map that includes information regarding the physical locations of the routers and the interconnections of the routers. The server uses this information to compute the best path to route the data packets from the source network node to the destination network node. The server can then inform the user, the user application, processor, or Router A of this best path.

It should be noted that, in the above embodiments, static routing is used to determine the network path before the data packet is sent. In another embodiment, dynamic routing (or adaptive routing) is used. For this embodiment, geographic constraint information is embedded (or encoded) within the data packets coming from the source network node. Each router along the path makes routing decisions based on its standard adaptive techniques (such as RIP or OSPF); however, in addition, the routers that do not meet the specified geographic constraints are removed from consideration. In this example, Router A would typically choose Router C to route the data packets to if Router A were using standard adaptive techniques. However, since Router C does not meet the geographic constraint of lying within the state of Oklahoma, Router B is removed from consideration. Since Router B represents the only direct connection to Router A that lies within the state of Oklahoma, Router B is chosen for the next data packet hop.

Figure 6:
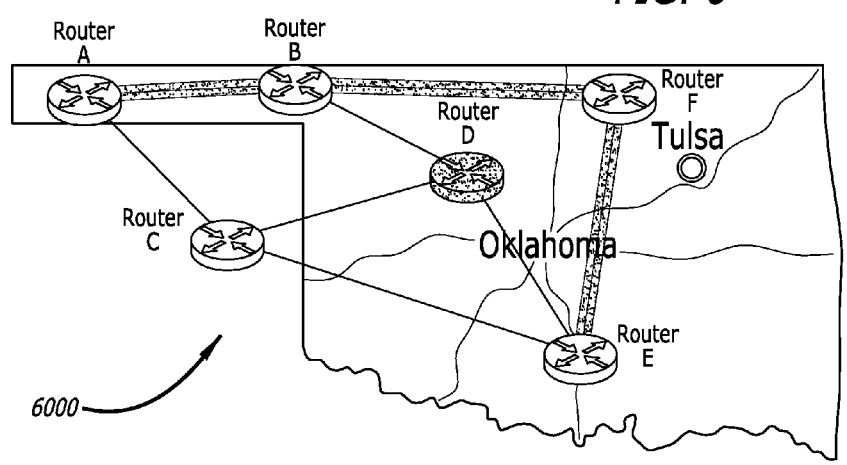
FIG. 6 depicts a schematic diagram of an exemplary network of six nodes on a map to illustrate the operation of the disclosed system and method for secure routing based on the physical locations of routers having a geographic constraint and a geothentication constraint, in accordance with at least one embodiment of the present disclosure.

FIG. 6 depicts a schematic diagram 6000 of an exemplary network of six nodes on a map to illustrate the operation of the disclosed system and method for secure routing based on the physical locations of routers having a geographic constraint and a geothentication constraint, in accordance with at least one embodiment of the present disclosure. In this figure, six nodes (or routers) (Router A, Router B, Router C, Router D, Router E, and Router F) are shown on a map of the state of Oklahoma. A user associated with Router A desires to send information (e.g., data packets) to a user associated with Router E. For this example, the information has security constraints that the information (i.e. the data packets) must remain in the state of Oklahoma, and that the information may only be routed through Geothenticated routers. Geothenticated routers are routers that have the ability to authenticate their physical location by using satellite geolocation techniques (refer to the description of FIGS. 14-17 for a discussion of example satellite geolocation techniques). In this example, all of the routers are Geothenticated routers, except for Router D. Using the disclosed secure routing method, the router path Router A-Router B-Router F-Router E is determined to meet both of the security constraints.

Figure 7:
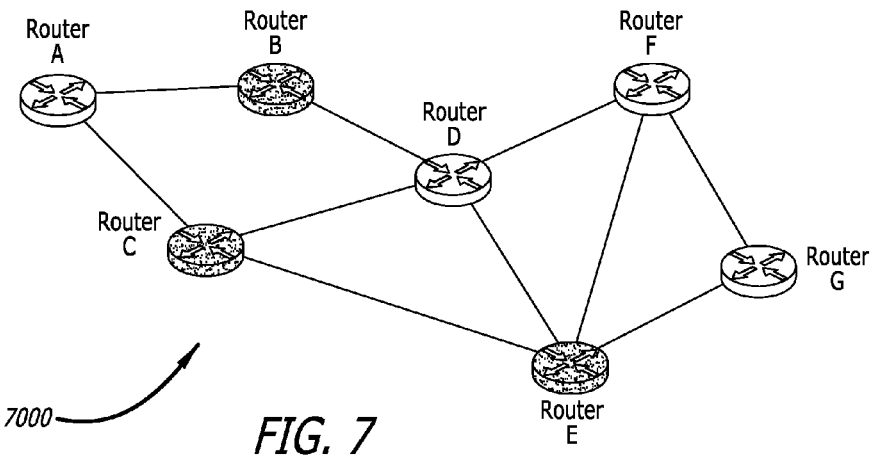
FIG. 7 depicts a schematic diagram of an exemplary network of seven nodes to illustrate the operation of the disclosed system and method for secure routing based on the physical locations of routers, in accordance with at least one embodiment of the present disclosure.

FIG. 7 depicts a schematic diagram 7000 of an exemplary network of seven nodes to illustrate the operation of the disclosed system and method for secure routing based on the physical locations of routers, in accordance with at least one embodiment of the present disclosure. In this figure, seven nodes (or routers) (Router A, Router B, Router C, Router D, Router E, Router F, and Router G) are depicted. A user associated with Router A desires to send information (e.g., data packets) to a user associated with Router G. The information has the security constraint that the information may only pass through geothenticated routers or, alternatively, through secure tunnels between Geothenticated routers. In this example, Router A, Router D, Router F, and Router G are Geothenticated routers, and Router B, Router C, and Router E are not.

Figure 8:
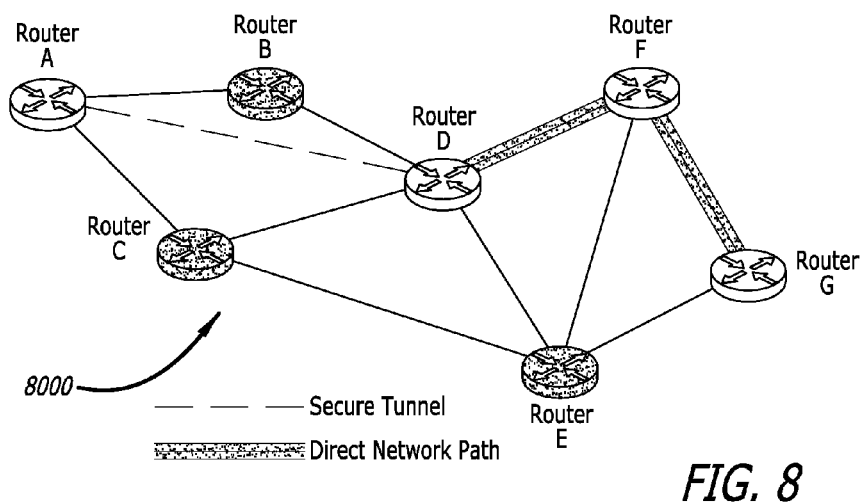
FIG. 8 illustrates the feature of tunneling in the exemplary network of FIG. 7, in accordance with at least one embodiment of the present disclosure.

Using the disclosed secure routing method, the path Router A-Router D-Router F-Router G can meet the constraints, but only if A and D are able to form a secure tunnel between them as shown in FIG. 8.

FIG. 8 is a schematic diagram 8000 illustrating the feature of tunneling in the exemplary network of FIG. 7, in accordance with at least one embodiment of the present disclosure. As previously mentioned above, the path Router A-Router D-Router F-Router G can meet the constraints, but only if A and D are able to form a secure tunnel between them. For this example, Router A will encrypt the data in the data packets before transmitting the data packets. The encrypted data packets transmitted from Router A to Router D, in this example, would actually physically pass through Router B or Router C. Since the data packets are encrypted (or otherwise protected), a malicious user at Router B and/or Router C will not be able to observe the data. Once the encrypted data packets arrive to Router D, Router D may decrypt the encrypted data packets.

It should be noted that in one or more embodiments, a single router (e.g., Router D) may be the only router in the network that has the ability to decrypt the encrypted data packets.

It should also be noted that, alternatively, in other embodiments, Router D may continue to transmit the encrypted data packets to Router F and Router G, and Router F or Router G may decrypt the encrypted data packets.

It should be noted that in one embodiment, the data packets traveling from the source network node to the destination network node have an optional path security constraint field. In one implementation, the path security constraint field contains a name string or a digital code that represents a political boundary such as a country, state, province, county, government facility, and/or city. In another implementation, the path security constraint field contains a set of latitudes and longitudes that define one or more polygons that define an acceptable geographic region. In another implementation, the path security constraint field has a bit which identifies whether the data packets may only travel through Geothenticated routers. In another implementation, the path security constraint field has a number that defines the maximum distance that the data packets are allowed to travel before being discarded.

Geothentication Based on Network Ranging

The system and method for geothentication based on network ranging relates to authenticating the physical location of a network node by using ranging measurements taken from at least one node with a known physical location. The physical location of at least one node is obtained via satellite geolocation techniques. Various types of satellite geolocation techniques may be employed by the disclosed system. The description of FIGS. 14 through 17 in the present disclosure discusses one exemplary satellite geolocation technique (i.e. spot beam based authentication) that may be utilized by the disclosed system.

Current access control approaches to combat the increasing number of cyber attacks are principally based on either static passwords or authentication based on password and badge credentials. As attacks are often conducted by impersonating the end user, there has been a tendency for organizations to focus on user authentication methods to curtail network vulnerabilities. These approaches continue to be vulnerable to sophisticated attacks and, thus, a need has developed for a new paradigm of access control leveraging additional information, such as the users' physical location. This information provides an additional and orthogonal layer of protection, which results in an enhanced correlation between location and contextual awareness from an integrated physical geolocation to a logical network and information management views. This means that incoming data for a particular network node may be vetted based on its physical location, and various access rights granted to it based on such information.

The physical location of a network node is currently difficult to ascertain using existing tools. Its location may be inferred by examining internet protocol (IP) addresses and host names, but these identifiers may be spoofed or obfuscated. Alternatively, and more securely, the physical location of a network node may be attained by estimation using network ping ranging measurements.

In the present disclosure, a ping is a computer network administration utility used to test the reachability of a node on an Internet Protocol (IP) network, and to measure the round-trip time for messages sent from an originating node (i.e. the node that sends the inquiry ping message) to a destination node (i.e. the node that receives the inquiry ping message and sends the response ping message). A ping operates by an originating node sending Internet Control Message Protocol (ICMP) echo request data packets to the destination node, and waiting for a response. In this process, a processor is used to measure the round-trip time from transmission of the inquiry ping message, and to record any data packet loss.

The system and method for geothentication based on network ranging have four primary features. The first primary feature is the use of network ping ranging measurements to estimate a physical location of a network node. Such a determination is achieved by sending pings from a network node(s) with a known location to the network node in question. In one or more embodiments, the originating node (i.e. the node that sends the inquiry ping message) will then examine the differentials between the time sent and the time received, and derive a physical range estimation. More than one originating node performing ping ranging can follow this process in order to improve the accuracy and the reliability of the end result.

The second primary feature is the use of ping pre-coordination and/or prioritization. This feature is based on the need for the immediate return of the ping (i.e. the immediate sending of a ping response message) from a destination node, which is crucial for the accuracy of the method of the first primary feature. Any associated delay introduced by the delay in the response will increase the measured network range and, thus, increase the maximum physical range measured. This increases the uncertainty of the actual physical location of the network node. As such, this feature proposes the use of various "Fast Track" methods in which results may be improved upon by using pre-coordination and/or prioritization of inquiry pings and/or response pings, which may allow for the destination node to respond to ping requests as quickly as possible, thereby reducing range error and improving the accuracy of the end result.

The third primary feature is the utilization of dedicated ping response "Fast Track" hardware. The use of dedicated ping response "Fast Track" hardware better enables the "Fast Track" methods of the second primary feature. Such hardware is attached to and/or connected to devices involved in the network ranging, and may also be used to improve the accuracy of the end result by pre-coordinating and/or prioritizing the responses to the ping inquiries.

The fourth primary feature is the use of unique identifiers (e.g., a pseudo random code (PRC) made up of some number of random bits) within inquiry ping messages such that cannot be predicted and that may be copied into the response ping messages by the destination node(s). These unique identifiers work to ensure that the response ping message(s) received by the originating node was, in fact, a response to the inquiry ping message that was sent by the originating node.

It should be noted that throughout the description of the figures a certain naming convention for the network nodes has been followed. The naming convention is as follows. A target node is a network node in question that the disclosed system and method will attempt to authenticate by verifying its physical location. A trusted node(s) is a network node(s) that has a known physical location. In one or more embodiments, the physical location of the trusted node(s) is obtained from satellite geolocation techniques. However, in some embodiments, the physical location of at least one trusted node is obtained through other means including, but not limited to, terrestrial mapping data. Also, an originating node is a network node that sends a inquiry ping message, and a destination node is a network node that receives the inquiry ping message and sends a response ping message back to the originating node.

Figure 9:
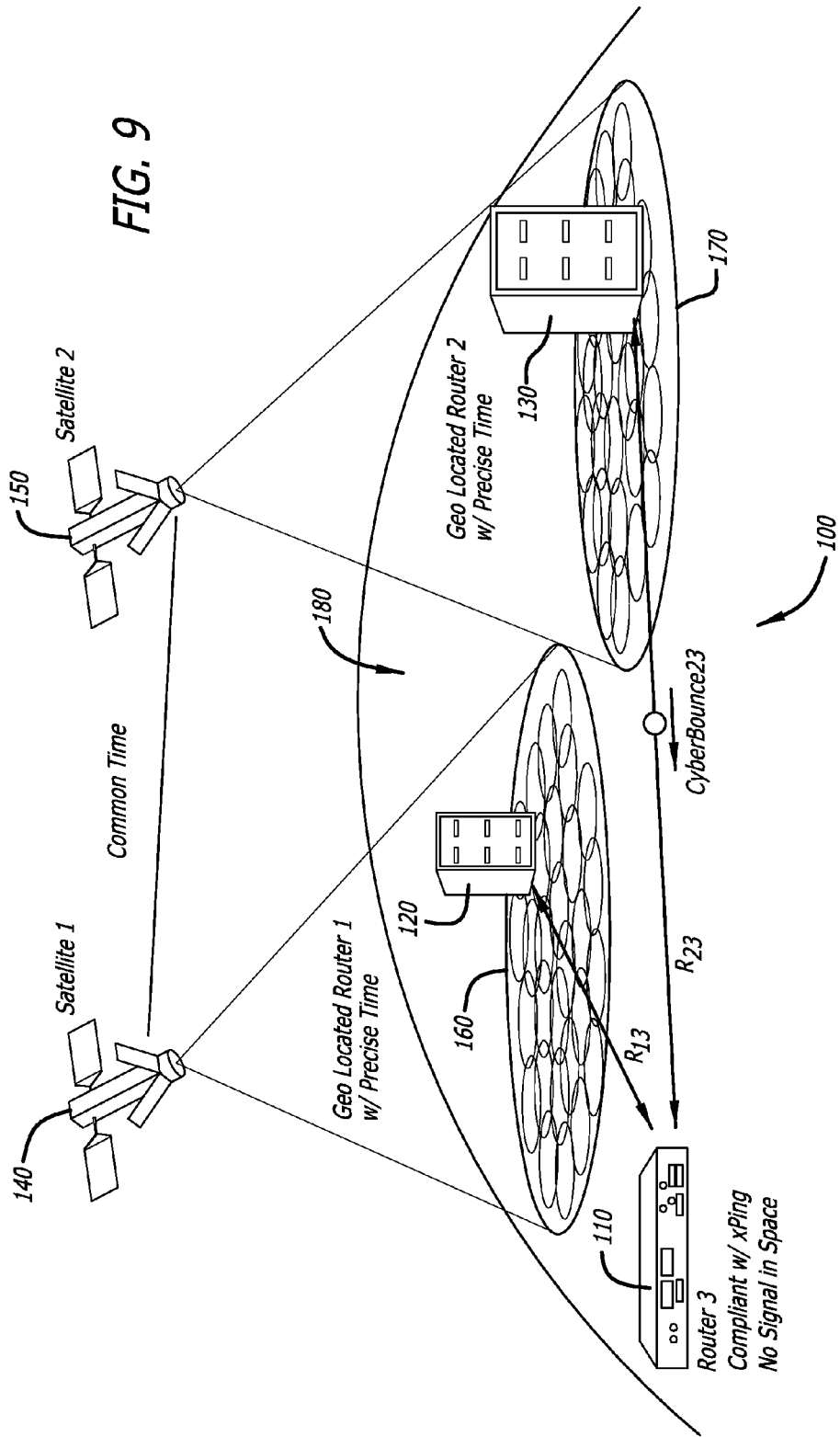

FIG. 9 is a schematic diagram of the disclosed system 100 for authenticating the physical location of a target node (Router 3) 110, in accordance with at least one embodiment of the present disclosure. In this figure, a network of network nodes 110, 120, 130 (which are implemented by routers) is shown in which authentication of the physical location for Router 3 110 is desired. Router 1 120 and Router 2 130 are at verified physical locations (as such they are referred to as trusted nodes), but the physical location of Router 3 110 is unknown or unverified.

The physical locations of Router 1 120 and Router 2 130 (i.e. trusted nodes) are obtained through satellite geolocation techniques. As is shown in this figure, Satellite 1 140 and Satellite 2 150 are both transmitting a plurality of spot beams 160, 170 on Earth 180. Router 1 120 and Router 2 130 are being illuminated by at least one of the plurality of spot beams 160, 170 being transmitted from Satellite 1 140 and Satellite 2 150, respectively. The physical locations of Router 1 120 and Router 2 130 are obtained from various different types of geolocation authentication systems and methods.

In one or more embodiments, a spot beam based authentication system and method is used by the system 100 to authenticate the physical locations of Router 1 120 and Router 2 130. For these embodiments, LEO Iridium satellites are employed for the satellites 140, 150 to each transmit at least one authentication signal that is used to authenticate the physical locations of Router 1 120 and Router 2 130. A receiving source (not shown) associated with Router 1 120 and a receiving source (not shown) associated with Router 2 130 are used to receive the authentication signals transmitted from Satellite 1 140 and Satellite 2 150 (i.e. transmission sources), respectively. A detailed discussion regarding the spot beam based authentication system and method is presented below in the Spot Beam Based Authentication Section of the present disclosure. In addition, it should be noted that an authenticator device (not shown) may be employed by the disclosed system 100 for authenticating the physical locations of Router 1 120 and Router 2 130 by evaluating at least one authentication signal transmitted from each of the satellites 140, 150. Additionally, it should be noted that in various embodiments, the authentication signals may be transmitted from the same transmission source, from different transmission sources, on the same frequency, and/or on different frequencies.

The spot beams of the plurality of spot beams 160, 170 may have a circular footprint as is shown in this figure, or in other embodiments may be a shaped spot beam that has a footprint of an irregular shape. Various types of satellites and/or pseudo-satellites may be employed for Satellite 1 140 and/or Satellite 2 150 of the disclosed system 100. Types of satellites that may be employed for the satellites 140, 150 include, but are not limited to, lower Earth orbiting (LEO) satellites, medium Earth orbiting (MEO), and geosynchronous Earth orbiting (GEO) satellites. In one or more embodiments, a LEO Iridium satellite is employed by the system 100 for the satellite 140, 150. Employing this type of satellite is advantageous because its transmission signal is strong enough to propagate through attenuated environments, including being propagated indoors.

It should be noted that in some embodiments, various other types of devices other than routers may be implemented for the network nodes 110, 120, 130 of the disclosed system 100. Types of devices that may be employed for the network nodes 110, 120, 130 include, but are not limited to, a server, a personal computing device, a personal digital assistant, a cellular phone, a computer node, an internet protocol (IP) node, a gateway, a Wi-Fi node, a network node, a personal area network (PAN) node, a local area network (LAN) node, a wide area network (WAN) node, a Bluetooth node, a ZigBee node, a Worldwide Interoperability for Microwave Access (WiMAX) node, a second generation (2G) wireless node, a third generation (3G) wireless node, and a fourth generation (4G) wireless node.

During operation of the disclosed system 100, Router 1 120 (i.e. the originating node) sends an inquiry ping message to Router 3 110 (i.e. the destination node) (see route $R_{13}$). In response to receiving the inquiry ping message, Router 3 110 sends a response ping message to Router 1 120 (see route $R_{13}$). A processor (not shown) associated with Router 1 120 calculates a ranging measurement from Router 1 120 to Router 3 110 by using an amount of time lapsed from Router 1 120 sending the inquiry ping message to Router 1 120 receiving the response ping message. This ranging measurement, which is referred to as network ping ranging, produces an approximation and a maximum bound of the physical range between the two network nodes (e.g., Router 1 120 and Router 3 110), and can be computed using the following equation:

$$R_{OD}=c[(t_{Da}-t_{Oa})+(t_{Ob}-t_{Db})+d]/2, \text{ where } t=\text{time and } c=\text{speed of signal} \quad (EQN\ 1)$$

Where "O" refers to the originating node (i.e. Router 1 120) that initiates the method by sending an inquiry ping message to "D" which refers to the destination node (i.e. Router 3 110), which in turn sends a response ping message to the originating node; and where "d" refers to time delays not related to signal travel time, such as the time required for the destination node to generate the response ping message after receiving the inquiry ping message. In some embodiments, more than one network node performing network ranging can follow this process to improve the accuracy and the reliability of the result. This may relate to individual nodes (i.e. routers, servers, personal computing devices such as laptops, desktops, PDAs, cell phones, etc.) or more collectively as a system of said network nodes.

Further, if the speed of signal (c) can be guaranteed to be below a maximum speed ($c_{MAX}$), then the measurement can establish not only a range estimate, but also a maximum range by the following equation:

$$R_{OD\_MAX}=c_{MAX}[(t_{Da}-t_{Oa})+(t_{Ob}-t_{Db})+d_{MIN}]/2, \text{ where } t=\text{time and } c_{MAX}=\text{maximum speed of signal} \quad (EQN\ 2)$$

Where "$d_{MIN}$" refers to the minimum possible delay time for the system (the most conservative assumption being to assume $d_{MIN}=0$.) For a particular pair of network nodes, multiple measurements can be taken, but rather than being averaged, the measurement that reports the smallest $R_{MAX}$ can be relied upon as the maximum range between the two network nodes.

It should be noted that in other embodiments, a processor that is not associated with Router 1 120 may perform the ranging measurement calculation. For these embodiments, Router 1 120 must transmit to the processor the amount of time lapsed from Router 1 120 sending the inquiry ping message to Router 1 120 receiving the response ping message. Once the processor receives the amount of time, the processor will be able to perform the ranging measurement calculation.

Then, a processor (e.g., the processor associated with Router 1 120, the processor associated with Router 2 130, or some other processor) uses the ranging measurement calculated from route $R_{13}$ to obtain and/or authenticate the physical location of Router 3 110.

As shown in this figure, Router 2 130 also sends an inquiry ping message to Router 3 110 (see route $R_{23}$). Router 3 110, in response to receiving the inquiry ping message, sends a response ping message to Router 2 130 (see route $R_{23}$, also referred to as CyberBounce23). A processor (not shown) associated with Router 2 130 calculates a ranging measurement from Router 2 130 to Router 3 110 by using an amount of time lapsed from Router 2 130 sending the inquiry ping message to Router 2 130 receiving the response ping message.

In alternative embodiments, a processor that is not associated with Router 2 130 may perform the ranging measurement calculation. For these embodiments, Router 2 130 must transmit to the processor the amount of time lapsed from Router 2 130 sending the inquiry ping message to Router 2 130 receiving the response ping message. Once the processor receives this amount of time, the processor can perform the ranging measurement calculation.

Then, a processor (e.g., the processor associated with Router 1 120, the processor associated with Router 2 130, or some other processor) uses the ranging measurement calculated from route $R_{23}$ in conjunction with the ranging measurement calculated from route $R_{13}$ in order to obtain and/or authenticate the physical location of Router 3 110. In other embodiments, the processor uses the ranging measurement calculated from route $R_{23}$ in order to improve the accuracy of the physical location for Router 3 110 that is obtained by using only the ranging measurement calculated from route $R_{13}$.

In one or more embodiments, a processor (e.g., the processor associated with Router 1 120, the processor associated with Router 2 130, or some other processor) uses the obtained physical location for Router 3 110 and the known physical locations for Router 1 120 and Router 2 130 to generate a physical map of the locations of these network nodes 110, 120, 130. The physical map may additionally contain various types of terrain data including, but not limited to, topological data, street names data, and landmark data. Furthermore, a mapping overlay of Internet Protocol (IP) information on the physical map may also be implemented.

It should be noted that the immediate return of the ping response message from the destination node is crucial for the accuracy of this method. Any delay introduced by the destination node will increase the measured network range between the network nodes and, therefore, increase the maximum physical range estimation between them. This increases the uncertainty of the actual physical location of the target node (i.e. Router 3 110), as there is a greater physical area in which it may lie.

In some embodiments of the present disclosure, the estimation of the physical location of a target node is improved upon by using pre-coordination and/or prioritization of ping messages, and may include the use of dedicated ping response message hardware. For example, a method for hastening the response to a ping inquiry message sent from an originating node may be utilized by the disclosed system 100 that informs the destination node, prior to the sending of the ping inquiry message, that a ping inquiry message is coming at a specified time. The destination node may then prepare immediately before the specified time to give the incoming inquiry ping packet message its top priority, and to immediately reply when the inquiry ping message arrives. In some embodiments, the destination node is programmed to send the response ping message after a specific amount of time has passed after the destination node has received the inquiry ping message. In at least one embodiment, the destination node is programmed to send the response ping message at a specific time or at specific times with a designated time interval, which is either defined or random.

In at least one embodiment, the inquiry ping message sent from an originating node to a destination node will contain a unique identifier that cannot be predicted (e.g. a number of random bits) that at least a portion of is copied into the response ping message that is sent from the destination node to the originating node. This ensures that the response ping message received by the originating node was, in fact, a response to the inquiry ping message it originally sent and not a response from a spoofer. In at least one embodiment, a random seed may be used to initiate a random number generator (e.g., pseudo random number generator) to provide the unique identifier.

In some embodiments, the prioritization of ping messages may be devised without using pre-coordination methods. For example, a level of priority could be assigned to data packets of varying priority and/or other queuing logic used to process packets as such. While data packets associated with the authentication of the physical location of a target node (i.e. ping message data packets) may be a high priority (or even at the highest priority above performing other actions), the system may additionally be utilized for sending other critical information that may be of greater overall importance, and thus a set of priority levels and/or queuing logic may be used to minimize the delay in the sending of the response ping message but while not impacting the quality of service for higher importance data routing.

Figure 10A:
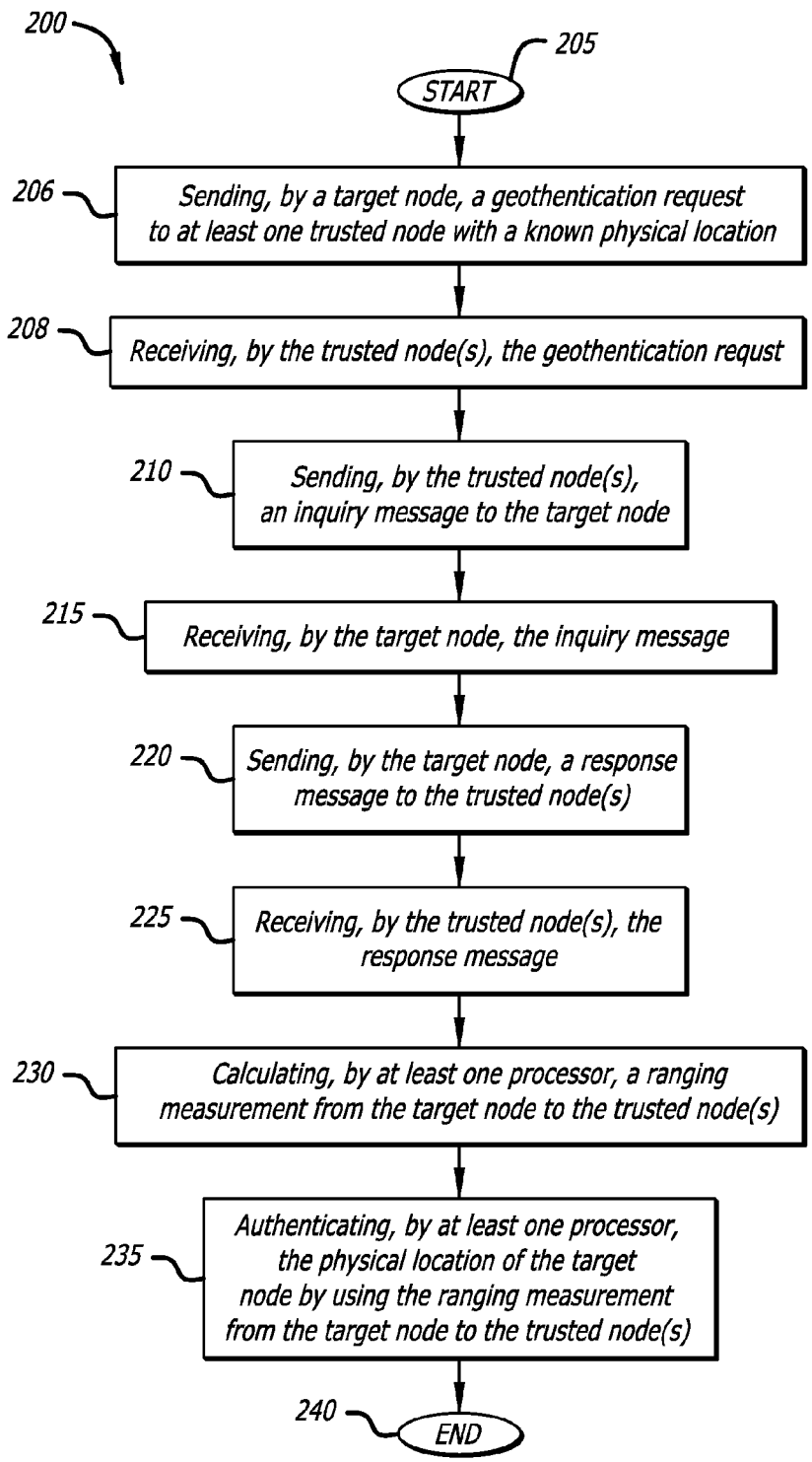
FIG. 10A is a flow diagram of the disclosed method for authenticating the physical location of a network node where the network node sends a geothentication request, in accordance with at least one embodiment of the present disclosure.

FIG. 10A is a flow diagram 200 of the disclosed method for authenticating the physical location of a target node where the target node sends a geothentication request, in accordance with at least one embodiment of the present disclosure. At the start 205 of the method, the target node sends a geothentication request to at least one trusted node with a known physical location 206. The physical location of the trusted node(s) is obtained via satellite geolocation techniques. Then, the trusted node(s) receives the geothentication request 208.

The trusted node(s) (i.e. the originating node(s)) then sends an inquiry ping message to the target node (i.e. the destination node) 210. Then, the target node receives the inquiry ping message 215. Soon after the target node receives the inquiry ping message, the target node sends a response ping message to the trusted node(s) 220. The trusted node(s) then receives the response ping message 225. After the trusted node(s) receives the response ping message, at least one processor calculates a ranging measurement from the target node to the trusted node(s) by using the amount of time elapsed from the sending of the inquiry ping message to the receiving of the response ping message 230. Once the processor(s) has calculated the ranging measurement, at least one processor (which may be the same or a different processor(s) than the processor(s) that calculated the ranging measurement) authenticates the physical location of the target node by using the ranging measurement from the target node to the trusted node(s) 235. After the processor(s) authenticates the physical location of the target node, the method ends 240.

Figure 10B:
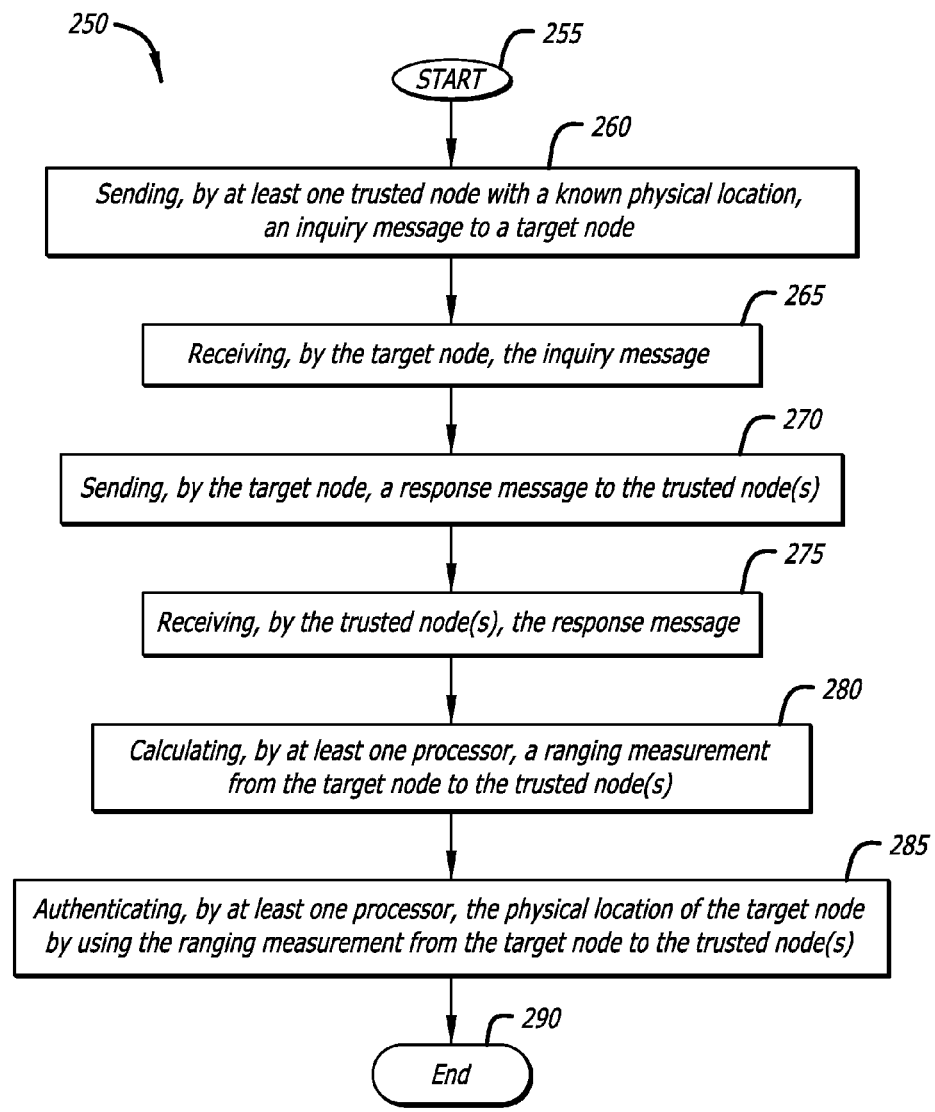
FIG. 10B is a flow diagram of the disclosed method for authenticating the physical location of a network node where at least one network node with a known location sends the inquiry message, in accordance with at least one embodiment of the present disclosure.

FIG. 10B is a flow diagram 250 of the disclosed method for authenticating the physical location of a target node where at least one trusted node with a known location sends the inquiry ping message, in accordance with at least one embodiment of the present disclosure. At the start 255 of the method, at least one trusted node with a known physical location (i.e. the originating node(s)) sends an inquiry ping message to the target node (i.e. the destination node) 260. The physical location of the trusted node(s) is obtained via satellite geolocation techniques.

Then, the target node receives the inquiry ping message 265. Soon after the target node receives the inquiry ping message, the target node sends a response ping message to the trusted node(s) 270. Then, the trusted node(s) receives the response ping message 275. After the trusted node(s) receives the response ping message, at least one processor calculates a ranging measurement from the network node to the trusted node(s) by using the amount of time elapsed from the sending of the inquiry ping message to the receiving of the response ping message 280. Once the processor(s) has calculated the ranging measurement, at least one processor (which may be the same or a different processor(s) than the processor(s) that calculated the ranging measurement) authenticates the physical location of the target node by using the ranging measurement from the target node to the trusted node(s) 285. After the processor(s) authenticates the physical location of the target node, the method ends 290.

Figure 11:
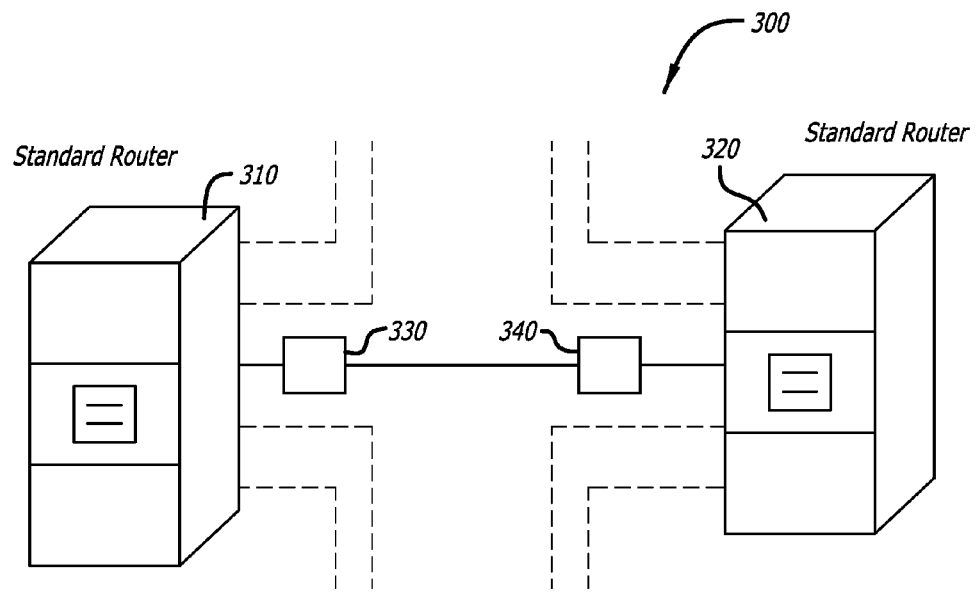

FIG. 11 is a schematic diagram 300 of two network routers 310, 320 each employing a response message hardware device 330, 340 for sending messages, in accordance with at least one embodiment of the present disclosure. In this figure, two network routers 310, 320 are shown to each be connected (i.e. by wire or wirelessly) to dedicated response message hardware (i.e. "Fast Track" device) 330, 340. In some embodiments, the dedicated response hardware 330, 340 is physically attached to or housed within the network routers 310, 320.

The response message hardware 330, 340 is able to send a response ping message after receiving an inquiry ping message with little to no delay. Since the response message hardware 330, 340 is able to send a response ping message with little to no delay, the response message hardware 330, 340 allows for a more accurate determination of the physical location of the target node by using network ping ranging measurements. The response message hardware devices 330, 340 reside in the path between the routers 310, 320, and they function to send and receive the ping inquiry messages and the ping response messages. For these embodiments, the response message hardware devices 330, 340 give the ping messages their highest priority.

The response message hardware devices 330, 340 may have the sole purpose of sending and receiving the specially-designated ping messages. The devices 330, 340 are designed to reside in the data path between nodes (e.g., routers 310, 320), and may serve as a pass-through for all data except the specially-designated ping messages, which the devices 330, 340 immediately return. In some embodiments, the devices 330, 340 may also inject signals into the data path between the nodes 310, 320 without interfering with the standard traffic. Pre-coordination of the sending of the ping messages may also be performed by the devices 330, 340.

In at least one embodiment, trust of a network node can be transferred from a node with a verified physical location (i.e. a trusted node) to a node without a verified physical location (i.e. a non-verified node or target node). This can occur, for example, when one dedicated response message hardware device 330 (adjacent to a node 310 with verified physical location, such as if a dedicated response message hardware device is attached to a computing device, for instance, through a universal serial bus (USB) connection) is commanded to send an inquiry ping message through the line. The corresponding response message hardware device 340 on the other end of the line (adjacent to a node 320 that does not have its physical location verified) quickly replies to the inquiry ping message by sending a response ping message. The first device 330 receives the returned response ping message, performs the ranging measurement calculation, and reports the network range to the non-verified node 320. A trusted, physically-verified node 310 can "transfer" trust if a dedicated response message hardware device 330, 340 is on both ends. Trust is inherited if the calculated range is consistent with measured and verified physical locations.

Figure 12:
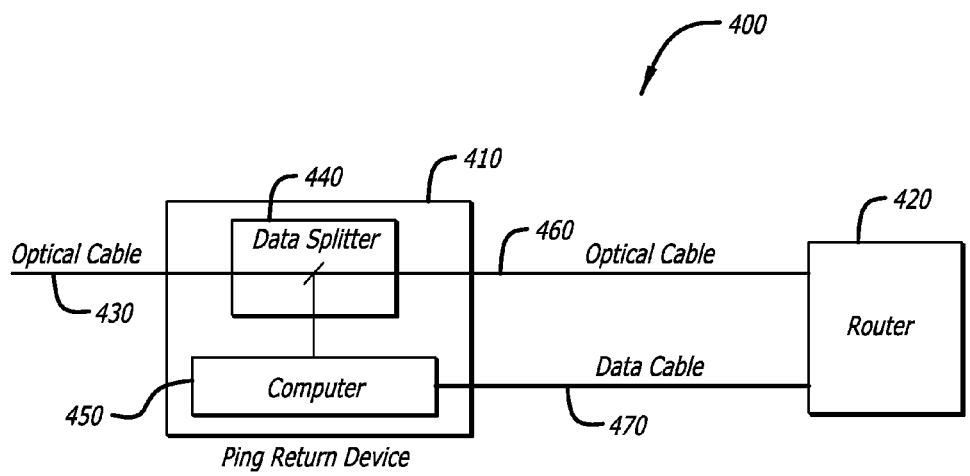

FIG. 12 is a schematic diagram 400 of a response message hardware device 410 attached to a router 420 showing the device 410 being placed in-line with the incoming data line (e.g., an optical fiber cable) 430, in accordance with at least one embodiment of the present disclosure. The response message hardware device 410 utilizes a data splitter 440 (e.g., a biconic coupler) to split the incoming data. The data splitter 440 passes the incoming data via an optical cable 460 (or via some other means) to the router 420, and also passes the incoming data to computer circuitry 450. The computer circuitry 450 passes the data via a data cable 470 to the router 420. By controlling the data flow of the attached router 420, the computing circuitry 450 may, thus, prioritize and/or pre-coordinate the ping messages between it 410 and other dedicated response message hardware devices, and may do so in a way to limit impact to the throughput data. For example, two routers each having a dedicated response message hardware device may both adhere to a schedule of times when they are to halt standard data transmission and perform the sending and receiving of the ping messages (e.g., perform the sending and receiving of ping messages during one millisecond of time after every ten (10) seconds of data transmission has passed).

In at least one embodiment, the dedicated response message hardware device 410 may also contain satellite tracking hardware and firmware to perform verification of the physical location of itself 410 and/or the router 420 using satellite ranging techniques. In one or more embodiments, the dedicated response message hardware device 410 could effectively be built into the network router 420 itself, therefore not requiring the use of a data splitter 440.

FIGS. 13A, 13B, and 13C are schematic diagrams 500, 505, 510, when viewed together, depicting a new node 520 (i.e. a target node) entering the network and having its physical location authenticated by the disclosed system, in accordance with at least one embodiment of the present disclosure. In at least one embodiment, a new node 520 may come "online" and send an inquiry ping message to aid in confirming it as a "trusted" node. This may be a case where the new node 520 contains trusted hardware and is located in a trusted location (e.g., the new node 520 is a new router that is installed on a military base). However, in at least one embodiment, the new node may be an uncontrolled device. In these embodiments, the new node may be converted to a "trusted" node when its physical location becomes verified through the use of ping ranging measurements.

In FIG. 13A, a new unauthenticated node 520 (i.e. a target node) that desires to be converted to a "trusted" node sends a geothentication ping request to Router 1 530, Router 2 540, and Router 3 550. The physical locations of the three routers 530, 540, 550 are verified by using satellite geolocation techniques that utilize signals transmitted from satellites 560, 570, 580. In response, in FIG. 13B, the routers 530, 540, 550 send inquiry ping messages to the new node 520. Once the new node 520 receives the ping inquiry messages, in FIG. 13C, the new node 520 sends response ping messages to the routers 530, 540, 550. Processors (not shown) associated with each of the routers 530, 540, 550 calculate a ranging measurement from the new node 520 to its associated router 530,

540, 550 by using the amount of time lapsed from the sending of the ping inquiry message to the receiving of the response ping message. At least one processor uses these calculated ranging measurements to authenticate the physical location of the new node 520. After the physical location of the new node is authenticated, the new node 520 is then considered to be a "trusted" node.

The disclosed methods allow network nodes to vet incoming data from a given node based on the node's physical location. In at least one embodiment, this may be used to improve the assigned trustworthiness of a network node. In some embodiments, access privileges may be granted based on the authentication of the node. In at least one embodiment, the access privileges granted may be based on the type of authentication method used for verifying the node's physical location, such that the method used with the highest accuracy/reliability may be assigned the highest level of access privileges, and alternatively the method with the lowest accuracy/reliability, relating to the node being the least trustworthy is assigned the lowest degree of access privileges.

Spot Beam Based Authentication

Entity or user authentication techniques enable a third party verifier to validate the identity and/or physical location of a user, asset, or a device (e.g., a claimant or network node) for a remote resource through a one-way authentication method. However, it should be noted that this one-way method may also be used directly by a host system to validate a claimant. An entity may be a device (e.g., a network node, a mobile phone, computer, server, or the like) or asset that needs to be tracked, while a user can be a person or other living/non-living entity. An entity and/or user may be authenticated for the duration of an entire connection or session. The entity and/or user may require re-authentication after the original authentication. The re-authentication requirements may be defined by the host network and may be context specific. Alternatively, this system may be used for a message-based authentication system which requires a separate authentication process for each message. Techniques described herein may be used for either session-based authentication, message-based authentication, or a combination thereof.

Additionally, this method may be applied to receiving devices themselves, such that the one-way authentication does not have to be completed by a remote third party but rather by one or more of the receiving devices. When this method is conducted by a single device it is still considered a one-way authentication method. However, this method can also be applied in a multi-way authentication technique to allow at least two peer devices to authenticate each other. In this one-way or multi-way device-to-device authentication method, authentication may generally rely on a shared secret (symmetric and asymmetric) that each of the two legitimate receiving devices know and any unauthorized or rogue receiving device does not know. Each device may have a unique authentication credential such as a secret password shared between itself and the peer device or public/private key pairs in the form of security certificates. A device has authenticated itself when it proves, to the satisfaction of the other peer device, that it knows the shared secret, and is, therefore, legitimate. Once authentication is complete between the at least two devices in this multi-way authentication method, the devices have proven their identities to one another. The devices may then create their own authenticated network which they may choose to implement cyber security policies which have been agreed on so as to protect the communication and access to networked resources for a given context.

Existing authentication methods may be used or combined to generate the initial-security key(s). The initial-security key may, for example, be cooperatively generated using Diffie-Hellman techniques or may simply be generated by one peer device and sent to the other via an alternate secure channel/process.

In any case, accompanying the initial-security key may include some shared liveness information (as previously defined). In this application, the liveness information is provided through a satellite spot beam and may include such parameters for use in authentication as a timestamp and pseudo-random number (PRN).

The use of the shared liveness information may be used in the derivation allowing for different security keys to be used every time the initiating device authenticates itself to the peer device. This hinders a potential rogue eavesdropper from initiating a statistical attack every time the initiating device is authenticated, adding newly intercepted messages to its analysis of messages intercepted during the initiating device's previous sessions. The liveness information and the initial-security key may then be passed as inputs to a determinative function. As used herein the term "determinative" refers to a function for which the outputs of the function are completely determined by the inputs. This determinative function may be run separately on the initiating device and on the peer device. If these two devices were to produce different outputs when they ran the determinative function, then the security keys derived from the function would not match, the device could not be authenticated, and thus could not be used for intercommunication.

In addition to being determinative, for security's sake the function should be inherently irreversible. Knowing the function's outputs, it should be very difficult or impossible to determine its inputs. Hashes form a class of functions that are both determinative and inherently irreversible and, as such, are often used in encryption and authentication calculations. Pseudo-random function (PRF) used with the well known Transport Level Security (TLS) protocol are an example of the determinative function implementation which may be used.

PRF combines the results of two well known hash functions, Message-Digest Algorithm 5 (MD5) and Secure Hash Algorithm 1 (SHA-1). PRF uses two hash functions in order to preserve security just in case someone determines how to reverse one of the two hash functions. These two hash functions produce outputs that may be too short to be optimum for security. SHA-1 produces 20-byte outputs, and MD5 produces 16-byte outputs. Therefore, for each of the two hash functions, a "data expansion function" may be defined that uses the hash function to produce output of arbitrary length. For SHA-1, the data expansion function may be defined as P_SHA-1:

$$P\_SHA\text{-}1(\text{initial-security key, liveness}) = SHA\text{-}1(\text{initial-security key}, A(1)+\text{liveness})+SHA\text{-}1(\text{initial-security key}, A(2)+\text{liveness})+SHA\text{-}1(\text{initial-security key}, A(3)+\text{liveness})+ \quad \text{EQ 1:}$$

where $A(0)=$liveness;

$A(i)=$SHA-1(initial-security key, $A(i-1)$);

and the "+" sign indicates string concatenation.

The definition of the data expansion function P_MD5 is similar to the above definition with "MD5" replacing "SHA-1" wherever it appears. The data expansion functions may be iterated to as many steps as necessary to produce output of a desired length. The desired output length may be set as an implementation option. In at least one embodiment, the desired output length for each hash function is 128 bytes. P_SHA-1 may be iterated out to A(7) for a total output length of 140 bytes (each iteration increasing the output length by 20 bytes). The output may then be truncated to 128 bytes. Each iteration of P_MD5 produces 16 bytes, so iterating it out to A(8) produces the desired 128 bytes with no truncation.

In one embodiment for spot beam based authentication, having chosen the hash functions and iterated their data expansion functions out to the desired output length, PRF takes as inputs the expanded initial-security key, a label (a pre-determined ASCII string), and the liveness information exchanged. PRF is defined to be the exclusive bit-wise OR (XOR) of the output of the two hash data expansion functions, P_MD5 and P_SHA-1:

$$\text{PRF(expanded initial-security key, label, liveness)} = P\_MD5(S1, \text{label}+\text{liveness}) \text{ XOR } P\_SHA\text{-}1(S2, \text{label}+\text{liveness}) \quad \text{EQ: 2}$$

where S1 the first half of the expanded initial-security key, measured in bytes, and S2 is the second half of the expanded initial-security key. (If the expanded initial-security key's length is odd, then its middle byte is both the last byte of S1 and the first byte of S2). As P_MD5 and P_SHA-1 are iterated to produce 128-byte outputs, the output of PRF is also 128 bytes.

The 128-byte output of PRF is divided into four 32-byte session security keys. Then each of the session security keys and truncates it to the length required by the authentication and encryption protocols being used. The truncated result is one of the new set of transient session security keys. The derivation of the transient session security keys allows for both the initiating device and peer device to not directly use either the initial-secret key or the expanded initial-security key in order to minimize, or at least to reduce, the leakage of the security key information. The derivation of the transient session security keys also allows for the initiating device and the peer device to refresh the session security keys derived from the expanded initial-security key at regular intervals or when commanded to prevent statistical analysis by limiting the use of the session security keys.

Each of the authentication and encryption transient session security keys have the following specific purpose: i) encryption of data exchanges, for confidentiality, from initiating device to peer device; ii) encryption of data exchanges, for confidentiality, from peer device to initiating device; iii) signing of data exchanges, for integrity, from initiating device to peer device; and iv) signing of data exchanges, for integrity, from peer device to initiating device.

Derivation of the initial-security key for the spot beam based authentication may use Diffie-Hellman techniques using agreed upon and well known public primitive root generator "g" and prime modulus "p". The initiating device and the peer device each choose a random secret integer and exchange their respective ((g^(secret integer)) mod p). This exchange allows the initiating device and peer device to derive the shared initial-secret key using Diffie-Hellman.

Having derived the initial-secret key that is shared between both the initiating device and the peer device they may use the data expansion to derive the expanded initial-secret using, for example, the P_SHA-1. The liveness information for the data expansion process may be a known random value or timestamp that is agreed upon by the initiating device and the peer device. In some embodiments, the peer device may select a random value and transmit it to the initiating device via the satellite or the terrestrial network. Alternatively, both the initiating device and the peer device may agree upon a timestamp, since they are tightly time synchronized, and thereby avoid data exchanges while being able to select liveness from the shared/common timestamp value.

Following this the initiating device and the peer device have a shared expanded initial-secret key that may be used to derive the new set of transient session security keys. Again for liveness the initiating device and the peer device may use either a shared random value that is transmitted by the peer device or a shared/common timestamp value. The transient session security keys may be used by initiating device and the peer device for further encryption and signing of geolocation and other context information exchanges between initiating device and peer device. Geolocation and other context information is considered confidential and hence it is appropriate that such information be encrypted to ensure that only the authenticated initiating device and peer device can extract the exchanged geolocation and context information. Note that the geolocation is authenticated by the procedure described in this patent application using pseudorandom (PRN) code segments and distinctive beam parameter. The context information shared may include other state or control information for targeted cyber defense application execution or decision support systems. In addition to encryption the integrity of the exchanged geolocation and context information is ensured by the use of the transient session security keys for signing purposes as discussed earlier.

In brief overview, in some embodiments the authentication systems and methods described herein may leverage geolocation techniques for determining the position of the claimant as part of the authentication process. One such geolocation technique is defined in commonly assigned and copending U.S. patent application Ser. No. 12/756,961, entitled Geolocation Leveraging Spot Beam Overlap, the disclosure of which in incorporated herein by reference in its entirety. When authentication is required, the claimant device may capture and transmit the distinctive signature parameters to a verifying device. In addition, the claimant device may transmit its claimed travel path (i.e., waypoint(s) and time at each). Waypoints may be transmitted whether the device is stationary or mobile. A verification device may use the claimant's claimed beam signature parameters, at least one location waypoint, and at least one time associated with this waypoint and beam parameter capture to authenticate the claimant. For example, a claimant may be considered authenticated by the verifier if the beam parameters captured from the at least one spot beam and the at least one claimed waypoint are affirmed against a known valid data set. In this manner, the claimant can be authenticated as being within a region at a particular time. The composite code based on these parameters provide a signal that is extremely difficult to emulate, hack, or spoof. Furthermore, the signal structure and satellite's received signal power allows for the authentication to be used indoors or other attenuated environment. This improves the overall utility of this system approach.

The subject matter of this application is described primarily in the context of low-earth orbiting (LEO) satellites such as those implemented by Iridium satellites. However, one skilled in the art will recognize that the techniques described here are readily applicable to other satellite systems, e.g., medium-earth orbit (MEO) satellite systems or geosynchronous orbit (GEO) satellite systems. Such satellite based communication systems may include or utilize other mobile communication systems, e.g., airborne communication systems or the like, as well as, stationary communication platforms including but not limited to a ship or a cell phone tower.

FIG. 14 is a schematic illustration of a satellite-based communication system 600, according to embodiments. In practice, a satellite based communication system 600 may comprise of at least one satellite 610 in orbit. In the interest of brevity, a single satellite is illustrated in FIG. 14. Referring to FIG. 14, in some embodiments a system 600 comprises one or more satellites 610 in communication with one or more receiving devices 620. In some embodiments the satellites 610 may be embodied as LEO satellites such as those within the Iridium satellite constellation. Satellite(s) 610 orbit the earth in a known orbit and may transmit one or more spot beams 630 onto the surface of the earth in a known pattern. Each spot beam 630 may include information such as pseudorandom (PRN) data and one or more distinctive beam parameters (e.g., time, satellite ID, time bias, satellite orbit data, etc.).

Receiving device(s) 620 may be implemented as communication devices such as satellite or cellular phones or as components of a communication or computing device, e.g., a personal computer, laptop computer, personal digital assistant or the like. In some embodiments, a receiving device (620) may comprise one or more locating or navigation devices or modules analogous to devices used in connection with the global positioning system (GPS).

FIGS. 15A, 15B, and 15C are schematic illustrations of satellite-based authentication systems 700, according to embodiments. Referring first to FIG. 15A, in some embodiments a satellite 610 in orbit transmits one or more spot beams 630 onto the earth's surface. A receiving device 620 may be configured to receive a signal from the spot beam. In the embodiment depicted in FIG. 15A the receiving device is ground-based and may be operating in attenuated environment. By way of example, an object 710 such as a roof, building, or the like may obstruct a portion of the communication path between satellite 610 and the receiving device.

A transmitter 720 transmits data received by the receiving device 620 and/or data generated by the receiving device 620 to a verifier 730. The transmitter 720 depicted in FIG. 15A is a wireless transmitter that relays the data from the receiving device to the verifier. However, one skilled in the art will recognize that data from receiving device 620 may be transmitted via a wired communication system, wireless communication system, or a combination of wired and wireless systems. The verifier 730 uses data captured via a spot beam by the receiving device 620 to prove to the verifier 730 that it is an authorized user via a one-way authentication approach which is also the case in FIG. 15B.

Furthermore, FIG. 15B depicts an arrangement in which the receiving device 620 may be airborne, e.g., in an aircraft 625. In the embodiment depicted in FIG. 15B the aircraft 625 may maintain an uplink with the satellite 610, e.g., an L-Band Uplink, and data captured by the receiving device 620 in the aircraft may be transmitted back to the satellite 610 via the uplink. The satellite 610 may transmit the data to a second cross-linked satellite 610, which in turn may transmit the data to a verifier 730.

The system depicted in FIG. 15C illustrates an embodiment in which two (or more) peer devices 620 may implement a two-way authentication technique to authentication each other. Referring briefly to FIG. 15C as described above a satellite 610 in orbit transmits one or more spot beams 630 onto the earth's surface. A first receiving device 620A may be configured to receive a signal from the spot beam. The first receiving device 620A may be configured to derive a security key, e.g., using a Diffie-Hellman approach as described above, which incorporates PRN data from the spot beam.

The PRN data is also transmitted to a second device 620B. In some embodiments the second device 620B may be outside the spot beam 630, in which case the PRN data may be transmitted by a computing device 740 coupled to the second device 620B via a communication network. The computing device 740 may be communicatively coupled to the satellite 610. By way of example, and not limitation, the computing device 740 may be a server that is separately coupled to the satellite 610 via a communication link. The computer 740 may be associated with a control network for satellite 610 and may thereby possess PRN data associated with the spot beam 630.

In operation, the first receiving device 620A initiates a request for authentication data, which is transmitted to the second receiving device 620B. The communication link between the first receiving device 620B may be direct or may be implemented through a transmit network 720. The second receiving device 620B responds to the request and issues a near-simultaneous request for authentication data from the first receiving device 620A. The first receiving device 620A authenticates the second receiving device 620B and issues a near-simultaneous response to for authentication data to the second receiving device 620B, which may then authenticate the first receiving device 620A.

As described above, the authentication process implemented between the first receiving device 620A and the second receiving device 620B may be a Diffie-Hellman exchange in which the shared secret comprises at least a portion of the PRN data transmitted by the spot beam 630. Thus, the system depicted in FIG. 15C enables peer-to-peer authentication of receiving device 620A, 620B. One skilled in the art will recognize that this two-way authentication approach could be extended to a receiving device and a server as well as other hardware architectures, or to more than two devices.

FIG. 16A is a schematic illustration of a computing system which may be adapted to implement a satellite based authentication system, according to embodiments. For example, in the embodiments depicted in FIGS. 15A and 15B the verifier 730 may be implemented by a computing system as depicted in FIG. 16A. Referring to FIG. 16A, in one embodiment, system 800 may include a computing device 808 and one or more accompanying input/output devices including a display 802 having a screen 804, one or more speakers 806, a keyboard 810, one or more other I/O device(s) 812, and a mouse 814. The other I/O device(s) 812 may include a touch screen, a voice-activated input device, a track ball, and any other device that allows the system 800 to receive input from a user.

The computing device 808 includes system hardware 820 and memory 830, which may be implemented as random access memory and/or read-only memory. A file store 880 may be communicatively coupled to computing device 808. File store 880 may be internal to computing device 808 such as, e.g., one or more hard drives, CD-ROM drives, DVD-ROM drives, or other types of storage devices. File store 880 may also be external to computer 808 such as, e.g., one or more external hard drives, network attached storage, or a separate storage network.

System hardware 820 may include one or more processors 822, at least two graphics processors 824, network interfaces 826, and bus structures 828. In one embodiment, processor 822 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 824 may function as adjunct processors that manage graphics and/or video operations. Graphics processors 824 may be integrated onto the motherboard of computing system 800 or may be coupled via an expansion slot on the motherboard.

In one embodiment, network interface 826 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 828 connect various components of system hardware 820. In one embodiment, bus structures 828 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 830 may include an operating system 840 for managing operations of computing device 808. In one embodiment, operating system 840 includes a hardware interface module 854 that provides an interface to system hardware 820. In addition, operating system 840 may include a file system 850 that manages files used in the operation of computing device 808 and a process control subsystem 852 that manages processes executing on computing device 808.

Operating system 840 may include (or manage) one or more communication interfaces that may operate in conjunction with system hardware 820 to transceive data packets and/or data streams from a remote source. Operating system 840 may further include a system call interface module 842 that provides an interface between the operating system 840 and one or more application modules resident in memory 830. Operating system 840 may be embodied as a UNIX operating system or any derivative thereof (e.g., Linux, Solaris, Berkeley Software Distribution (BSD), Android, etc.) or as a Windows® brand operating system, or other operating systems.

In various embodiments, the computing device 808 may be embodied as a personal computer, a laptop computer, a personal digital assistant, a mobile telephone, an entertainment device, or another computing device.

In one embodiment, memory 830 includes an authentication module 862 to authenticate a claimant based on data received from the claimant. In one embodiment, an authentication module 862 may include logic instructions encoded in a non-transitory computer-readable medium which, when executed by processor 822, cause the processor 822 to authenticate a claimant based on data received from the claimant. In addition, memory 830 may comprise a satellite orbit database 864 which includes orbit information for satellites 610 in a predetermined orbit around the earth. Additional details about the authentication process and operations implemented by authentication module 862 are described below.

In some embodiments the receiving device 620 may be implemented as a satellite communication module adapted to couple with a conventional computing device 622 (e.g., a laptop, a PDA, or a smartphone device). The receiving device 620 may be coupled to the computing device 622 by a suitable communication connection, e.g., by a Universal Serial Bus (USB) interface, an RS-232 interface, an optical interface, or the like. In the embodiment depicted in FIG. 16B the receiving device 620 may be a "thin" device in the sense that it may include a receiver and limited processing capability, e.g., an application specific integrated circuit (ASIC) or a field programmable gate array (FPGA) configured to implement an authentication routine.

In operation, a user of the computing device 622 may utilize the receiving device 620 to authenticate the computing device 622 with a host network 890. As described above, the receiving device 620 depicted in FIG. 16B may receive a spot beam transmission 630 from the satellite 610 which includes a distinctive beam signature and a pseudo-random number (PRN). The computing device 622 may initiate an access request to the host network 890. The access request may include user specific information, e.g., a user ID, one or more coordinated from an earth-based coordinate system (e.g., a zip code, an area code, a latitude/longitude, a Universal Transverse Mercator (UTM); an Earth-Centered Earth-Fixed (ECEF), a World Geographic Reference System (GEOREF), or other miscellaneous system, for example, a zip code) and at least a portion of the PRN data received from the satellite 610.

The host network 890 may transmit a user access request to the verifier 730 as an authentication request. In some embodiments the host network may add additional information to the request en enable the verifier 730 to authenticate the computer 622. By way of example, the host network 630 may provide limitations regarding where (i.e., from what geographic locations) the claimant may be authenticated). The verifier 730 may verify the claimant and provide an authentication response to the host network 890. The host network 890, in turn, may forward an access response to the computing device 622.

FIG. 17 is a flowchart illustrating operations in a method to authenticate a claimant, according to embodiments. Referring to FIG. 17, at operation 910 a claimant device determines a physical location of the claimant device. In some embodiments a claimant device 620 may comprise one or more location modules to determine a location of the claimant device 620. By way of example and not limitation, claimant device 620 may include, or be communicatively coupled to, a global positioning system (GPS) module to determine a location based on signals from the global positioning system. Alternatively, or in addition, claimant device 620 may include logic to determine a location based on signals from one or more LEO or MEO satellites 610 as described in one or more of U.S. Pat. Nos. 7,489,926, 7,372,400, 7,579,987, and 7,468,696, the disclosures of which are incorporated herein by reference in their respective entireties. In some embodiments the location of the claimant device 620 may be expressed in latitude/longitude coordinates or another earth-based coordinate system.

At operation 915 the claimant device 620 receives a spot beam transmission from a satellite 610. In some embodiments the claimant device 620 extracts one or more distinctive beam parameters (e.g., time, satellite ID, beam ID, time bias, satellite orbit data, etc.) including a pseudo random code segment from the satellite spot beam. In some embodiments the claimant device 620 may store the beam parameters in a memory module in, or communicatively coupled to, the claimant device 620. In one or more embodiments operation 915 may occur near simultaneously to its preceding operation 910.

At operation 920 the claimant device 620 may continue to generate one or more waypoint data snapshots which may include the location information for the claimant device 620 from operation 910, and one or more of the distinctive beam parameters transmitted via the satellite spot beam as noted in operation 920. In some embodiments the waypoint data snapshots may be stored in a memory module in, or communicatively coupled to, the claimant device 620.

In some embodiments the claimant device 620 may collect an array of waypoint data snapshots over time. For example, an array of waypoint data snapshots may be constructed by receiving spot beams from a plurality of satellites 610 passing over the claimant device 620 over time. Alternatively, or in addition, an array of waypoint data snapshots may be constructed by moving the claimant device 620 in relation to the satellites 610, for example, by placing the claimant device 620 in an aircraft 625 as depicted in FIG. 15B. An additional example would include a claimant device which acts as a tracker to validate the traveled route of an entity or asset which may include dangerous materials. The claimant device may be polled to provide waypoint data to verify the expected path matches that of the actual. The claimant device may be polled randomly.

At operation 920 the waypoint data snapshot(s) are transferred from the claimant device 620 to a verifier device 730. By way of example, in the embodiment depicted in FIG. 15A the waypoint data snapshot(s) may be transmitted via a transmitter 720 or by another communication network. In the embodiment depicted in FIG. 15B the waypoint data snapshot(s) may be transmitted from the aircraft 625 to a satellite 610, then may be transmitted via a satellite network to a verifier device 730.

At operation 925 the verifier device 730 receives location data and waypoint data from the claimant device 620. At operation 930 the verifier device 730 compares the location information and the waypoint data to corresponding data in a known valid data set in order to authenticate the claimant. By way of example, a LEO satellite such as the Iridium satellite constellation circumnavigates the earth in a known orbit, the approximate parameters of which are available well in advance. A verifier device 730 may include a satellite orbit database 864, or be communicatively coupled to a satellite orbit database 864, which includes orbit information about satellites 610 in a known orbit about the earth.

In some embodiments the location data and waypoint data received from the claimant device is compared (operation 930) with location and waypoint data from the known data set to determine whether the claimant device 620 is, in fact, within a reasonable threshold distance of an expected geographic location at an expected time. By way of example and not limitation, the satellite orbit database 864 may be searched for a data record corresponding to the distinctive beam parameters transmitted from the claimant device 620. When a matching record is located, the orbit data from the record retrieved from the orbit database 864 may be compared to the data received from the claimant device 620. For example, the known data may comprise a coordinate for the center of the spot beam 630 and an indication of the radius of the spot beam 630 on the surface of the earth. The coordinates received from the claimant device 620 may be compared to the location of the spot beam to determine whether the received data indicates that the claimant device 620 is within the region circumscribed by the spot beam at the time indicated in the data received from the claimant device. In at least one embodiment, the spot beam may be irregular shaped. In at least one embodiment the claimant device may be at an altitude above the surface of the earth.

If, at operation 935, the data received from the claimant device 620 indicates that the claimant device 620 is within a geographic region encompassed by the spot beam from the satellite 610 at the time associated with the data from the claimant device, then the claimant device 620 may be considered authenticated. In an authentication system, control then passes to operation 940 and the claimant is allowed to access a resource. By way of example and not limitation, the verifier device 730 may grant a token to an authenticated claimant device 620. The token may be used by a remote system to grant access to a resource.

By contrast, if the data received from the claimant device 620 indicates that the claimant device 620 is not within a geographic region encompassed by the spot beam from the satellite 610 at the time associated with the data from the claimant device 620, then the claimant device 620 may not be considered authenticated. In an authentication system, control then passes to operation 945 and the claimant is denied access to a resource. By way of example and not limitation, the verifier device 730 may deny a token to an authenticated claimant device 620. In the absence of a token the claimant device may be denied access to a resource managed by a remote system.

Thus, the system architecture depicted in FIGS. 14-16 and the method depicted in FIG. 17 enable satellite-based authentication of one or more claimant device(s) 620. The authentication system may be used to allow or deny access to one or more resources managed by a remote computing system. In some embodiments the claimant device(s) may be stationary, while in other embodiments the claimant device(s) may be mobile, and the authentication process may be either time-based, location-based, or a combination of both.

In some embodiments the system may be used to implement session-based authentication in which the claimant device(s) 620 are authenticated to use a resource for an entire session. In other embodiments the system may implement message-based authentication in which the claimant device(s) 620 must be authenticated separately for each message transmitted from the claimant device(s) 620 to a remote resource.

In one example implementation, an authentication system as described herein may be used to provide authentication for access to a secure computing resource such as a corporate email system, a corporate network, a military or civil infrastructure network, or an electronic banking facility. In other example implementations, an authentication system may be used to confirm the itinerary of a vehicle in a logistics system. By way of example, a mobile entity such as a truck, train, watercraft or aircraft may comprise one or more claimant device(s) 620. During the course of a scheduled mission a logistics system may periodically poll the claimant device(s) 620, which may respond with authentication data obtained from the satellite 610. The authentication data may be collected in the logistics system and used to confirm that the claimant device(s) are in specific locations at predetermined times in accordance with a logistics plan.

In yet another example, implementation of an authentication system as described herein may be used to verify the location of a claimant device(s) associated with a monitoring system, e.g., a house arrest surveillance system. In such embodiments the claimant device(s) may incorporate one or more biometric sensors such as a fingerprint biometric sensor to authenticate the user of the system, while the authentication system may be used to confirm that the claimant device is in a predetermined location at a predetermined time (i.e., the claimant is in the right place, at the right time, and is the right person). The authentication device may also review the claimant device location against a defined list of approved locations which may also further be refined by the authentication system by reviewing the claimant device's location and time against an approved set of location(s) at an approved time period(s). Furthermore, this system may be used to track registered sex offenders.

In some embodiments the satellite 610 may be part of a LEO satellite system such as the Iridium constellation which orbits the earth in a known orbit and which transmits spot beams having a known geometry, such that a claimant device(s) may be authenticated by confirming that the claimant device is within a designated spot beam at a designated time. Thus, a claimant may be authenticated using a single signal source (e.g., a single satellite 610). Also because LEO satellites such as the Iridium constellation and MEO satellites transmit a relatively high power signal levels the system may be used to authenticate one or more claimant device(s) which are located in an obstructed environment, e.g., indoors or in urban locations. Also, the relatively high signal strength of LEO satellites and MEO satellites leaves these signals less susceptible to jamming efforts.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for secure data transmission of at least one data packet through a plurality of network nodes, the method comprising:
   defining, by at least one user, a source network node and a destination network node, wherein the source network node and the destination network node are in the plurality of network nodes;
   defining, by the at least one user, at least one security constraint, wherein at least one of the at least one security constraint is based on a physical geographical location of at least one of the network nodes, wherein the at least one security constraint is at least one of:
      the at least one data packet is routed through network nodes that are physically located within at least one specified geographic region, or through network nodes that are not physically located within the at least one specified geographic region,
      the at least one data packet is routed through network nodes that can have their physical locations authenticated by using at least one of: satellite geolocation techniques, network ping ranging measurements, or triangulation methods,
      if any network nodes are unable to have their physical locations authenticated, the at least one data packet can be routed through such network nodes if the at least one data packet is encrypted while the at least one data packet passes through such network nodes, and
      the at least one data packet travels from the source network node to the destination network node on a route that has a length less than a threshold distance;
   comparing, by at least one processor, available network nodes in a map of the network nodes with the at least one security constraint to determine which of the available network nodes are qualified network nodes, wherein the qualified network nodes are the available network nodes that meet the at least one security constraint, wherein the map of the network nodes comprises at least one of:
      information regarding whether any of the network nodes are physically located within the at least one specified geographic region, or are not physically located within the at least one specified geographic region,
      information regarding whether the physical location of any of the network nodes can be authenticated by using at least one of: satellite geolocation techniques, network ping ranging measurements, or triangulation methods,
      information regarding whether any of the network nodes can encrypt or decrypt data packets, and
      information regarding whether any of the network nodes have been determined to be qualified network nodes;
   determining, by the at least one processor, a route comprising at least one of the qualified network nodes to route the at least one data packet through from the source network node to the destination network node, wherein any of the network nodes that does not meet the at least one security constraint is removed from consideration, and wherein the route comprises a network path that is optimized both for efficiency and security based on a requirement that the at least one security constraint is met by the at least one qualified network node; and
   transmitting the at least one data packet from the source network node to the destination network node through the optimal route comprising the at least one qualified network node.

2. The method of claim 1, wherein the at least one user is at least one of a person, an entity, an application, a program, a node, a router, a mobile device, a processor, and a computer.

3. The method of claim 1, wherein the at least one specified geographic region is at least one of a nation, a state, a province, a county, a government facility, and a city.

4. The method of claim 1, wherein at least one of the at least one specified geographic region is defined by a polygon, which is defined by points, wherein the polygon is one of a regular shape or an irregular shape.

5. The method of claim 4, wherein the points are defined by the at least one user specifying a longitude and a latitude of each of the points.

6. A method for secure data transmission of at least one data packet through a plurality of network nodes, the method comprising:
   defining, by at least one user, a source network node and a destination network node, wherein the source network node and the destination network node are in the plurality of network nodes;
   defining, by the at least one user, at least one security constraint, wherein at least one of the at least one security constraint is based on physical geographical location of at least one of the network nodes, wherein the at least one security constraint is at least one of:
      the at least one data packet is routed through network nodes that are physically located within at least one specified geographic region, or through network nodes that are not physically located within the at least one specified geographic region,
      the at least one data packet is routed through network nodes that can have their physical locations authenticated by using at least one of: satellite geolocation techniques, network ping ranging measurements, or triangulation methods, if any network nodes are unable to have their physical locations authenticated, the at least one data packet can be routed through such network nodes if the at least one data packet is encrypted while the at least one data packet passes through such network nodes, and the at least one data packet travels from the source network node to the destination network node on a route that has a length less than a threshold distance;

encoding, by at least one processor, the at least one security constraint into the at least one data packet;

comparing, by the source network node, available network nodes in a map of the network nodes with the at least one security constraint to determine which of the available network nodes connected to the source network node are qualified network nodes, wherein the qualified network nodes are the available network nodes that meet the at least one security constraint, wherein the map of the network nodes comprises at least one of;

information regarding whether any of the network nodes are physically located within the at least one specified geographic region, or are not physically located within the at least one specified geographic region, information regarding whether the physical location of any of the network nodes can be authenticated by using at least one of: satellite geolocation techniques, network ping ranging measurements, or triangulation methods, information regarding whether any of the network nodes can encrypt or decrypt data packets, and information regarding whether any of the network nodes have been determined to be qualified network nodes;

transmitting, by the source network node, the at least one data packet to one of the qualified network nodes, wherein any connected network node that does not meet the at least one security constraint is removed from consideration;

determining, by any network node that receives the at least one data packet, which available network nodes connected to the network node that receives the at least one data packet are qualified network nodes based on the map of network nodes; and transmitting, by any network node that receives the at least one data packet, the at least one data packet to one of the qualified network nodes, wherein any connected network node that does not meet the at least one security constraint is removed from consideration, wherein the at least one data packet is transmitted in an optimal route from the source network node to the destination network node through the qualified network nodes, wherein the route comprises a network path that is optimized for both efficiency and security based on a requirement that the at least one security constraint is met by the qualified network nodes.

7. The method of claim 6, wherein the at least one user is at least one of a person, an entity, an application, a program, a node, a router, a mobile device, a processor, and a computer.

8. The method of claim 6, wherein the at least one specified geographic region is at least one of a nation, a state, a province, a county, a government facility, and a city.

9. The method of claim 6, wherein at least one of the at least one specified geographic region is defined by a polygon, which is defined by points, wherein the polygon is one of a regular shape or an irregular shape.

10. The method of claim 9, wherein the points are defined by the at least one user specifying a longitude and a latitude of each of the points.

11. The method of claim 6, wherein when the source network node determines that there are not any available network nodes connected to the source network node that are qualified network nodes, a negative acknowledgment message is sent to the user indicating that the at least one data packet will not be able to reach the destination network node.

12. The method of claim 6, wherein when any network node that receives the at least one data packet determines that there are not any available network nodes connected to the network node that received the at least one data packet that are qualified network nodes and determines that the at least one data packet did not reach the destination network node, a negative acknowledgment message is sent to the user.

13. The method of claim 11 or 12, wherein in response to receiving the negative acknowledgment message, the at least one user may define at least one different security constraint to be used for the retransmission of the at least one data packet, and attempt to resend the at least one data packet.

* * * * *